(12) United States Patent
Takenaka

(10) Patent No.: US 12,047,538 B2
(45) Date of Patent: Jul. 23, 2024

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Yoko Takenaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/360,433

(22) Filed: Jun. 28, 2021

(65) Prior Publication Data

US 2022/0006908 A1      Jan. 6, 2022

(30) Foreign Application Priority Data

Jul. 1, 2020    (JP) .................................. 2020-114214

(51) Int. Cl.
*G06F 15/00* (2006.01)
*H04N 1/00* (2006.01)
*H04N 1/44* (2006.01)

(52) U.S. Cl.
CPC ....... *H04N 1/0048* (2013.01); *H04N 1/00244* (2013.01); *H04N 1/00464* (2013.01); *H04N 1/444* (2013.01); *H04N 2201/0094* (2013.01)

(58) Field of Classification Search
CPC ............. H04N 1/0048; H04N 1/00244; H04N 1/00464; H04N 1/444; H04N 2201/0094
USPC ......................................................... 358/1.13
See application file for complete search history.

(56) References Cited

U.S. PATENT DOCUMENTS

2006/0039024 A1* 2/2006 Iida ........................ G06F 3/1234
                                                                    358/1.14
2013/0291077 A1* 10/2013 Sato ........................ H04L 63/10
                                                                    726/6
2019/0004751 A1* 1/2019 Ikeda .................. H04N 21/4882

FOREIGN PATENT DOCUMENTS

JP            2019010787 A        1/2019

* cited by examiner

*Primary Examiner* — Mark R Milia
(74) *Attorney, Agent, or Firm* — Canon U.S.A., Inc. IP Division

(57) ABSTRACT

To solve the problem that it is troublesome for a user to uniformly display an error screen related to signage display, there is provided an information processing apparatus in which, in a case where the error regarding signage display occurs, whether to display an error screen is controlled based on a predetermined condition.

14 Claims, 32 Drawing Sheets

FIG.5A

LOGIN

USER NAME: [Admin]
PASSWORD: [●●●●●]
LOGIN DESTINATION: [THIS DEVICE ▼]

ENTER USER NAME AND PASSWORD, DESIGNATE LOGIN DESTINATION, AND CLICK "LOGIN".

[LOGIN]

FIG.5B

SETTINGS/REGISTRATION   TO PORTAL   LOGIN USER: Admin   LOGOUT

- ENVIRONMENT SETTINGS
  - PAPER SETTING
  - TIMER/POWER SETTING
  - NETWORK
  - EXTERNAL INTERFACE
  - VOLUME CONTROL
- ADJUSTMENT/MAINTENANCE
  - IMAGE QUALITY ADJUSTMENT
- FUNCTION SETTINGS
  - COMMON
  - COPY
  - PRINTER
  - STORE/UTILIZE FILE
- MANAGEMENT SETTINGS
  - USER MANAGEMENT
  - DEVICE MANAGEMENT
  - LICENSE/OTHERS
  - DATA MANAGEMENT
  - SECURITY SETTING

SETTINGS/REGISTRATION: ENVIRONMENT SETTINGS: PAPER SETTING
ENVIRONMENT SETTINGS: PAPER SETTING

PAPER SETTING
MANAGEMENT SETTING FOR PAPER TYPE

| Key | value |
|---|---|
| signage_settings.signage_disp | 1 |
| signage_settings.signage_protocol | 1 |
| signage_settings.signage_smb_adrs | \\guest_smb\share\image.jpg |
| signage_settings.signage_smb_user | guest |
| signage_settings.signage_smb_passwd | guest |
| signage_settings.signage_webdav_adrs | https://guest_webdav/signage.html |
| signage_settings.signage_webdav_user | user |
| signage_settings.signage_webdav_passwd | user |
| signage_settings.signage_webdav_cert | 1 |
| signage_settings.signage_webdav_cert_cn | 1 |
| signage_settings.signage_timing | 1 |
| signage_settings.signage_printing_disp | 1 |
| signage_settings.signage_err_disp | 1 |

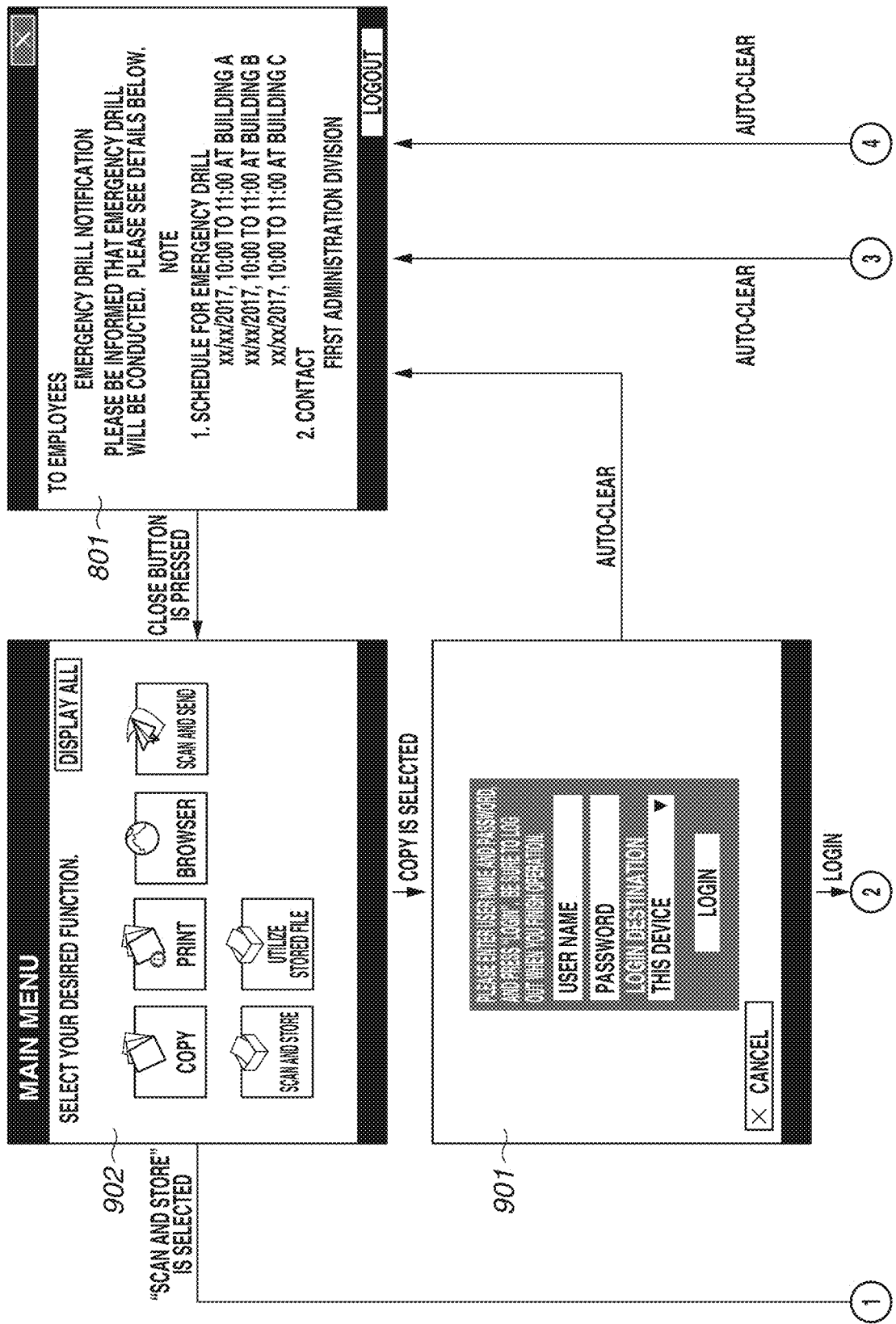

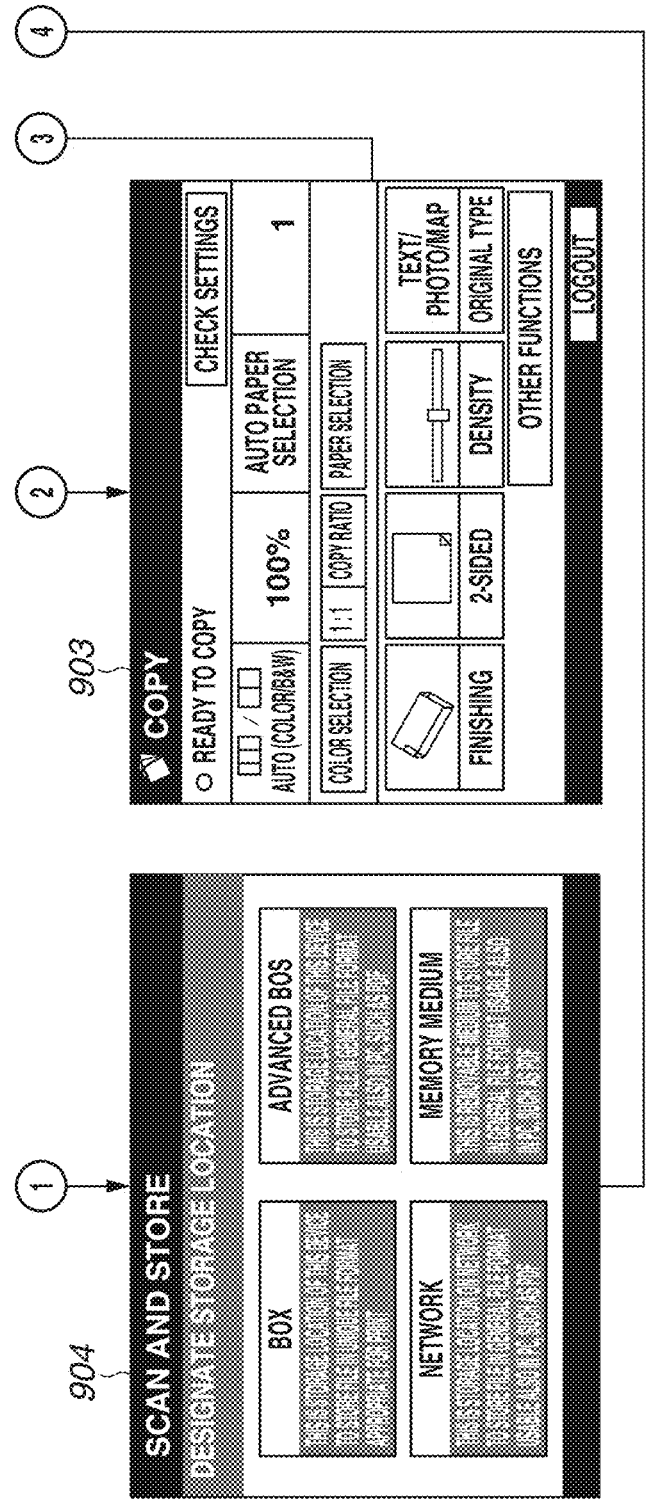

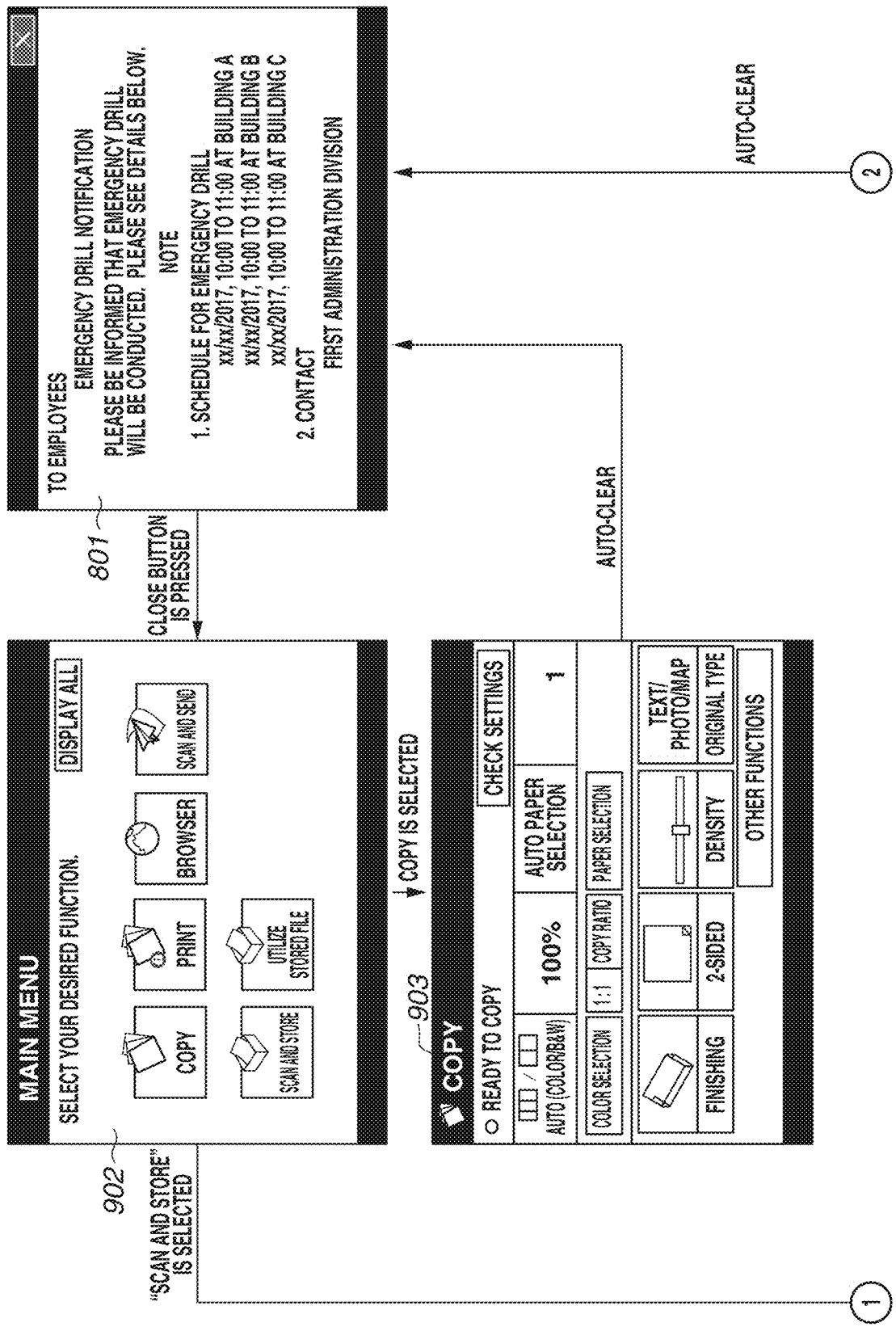

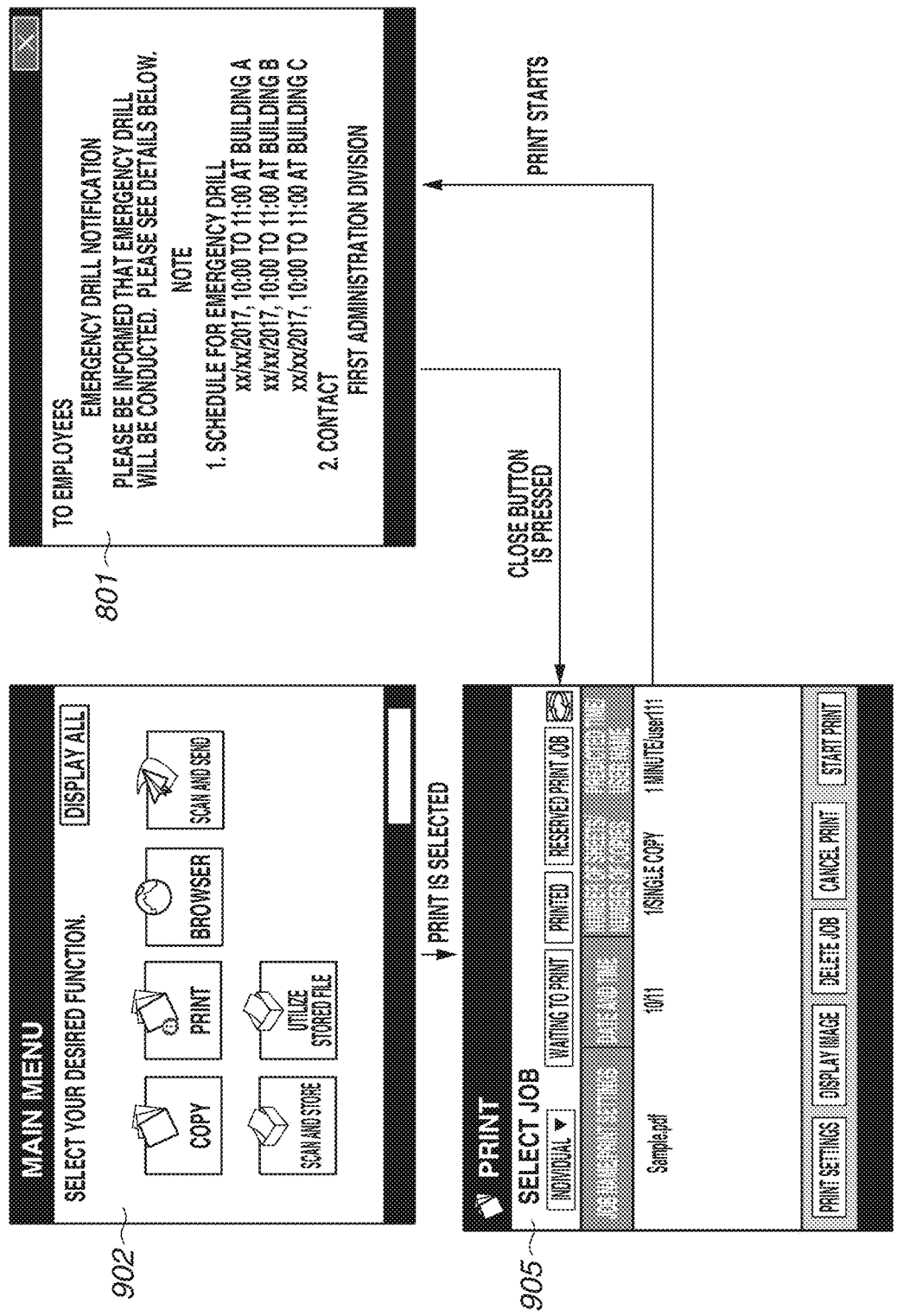

FIG.11

| ERROR CODE | ERROR TYPE |
|---|---|
| 1 | NO-FILE ERROR |
| 2 | AUTHENTICATION ERROR |
| 3 | COMMUNICATION ERROR |
| 4 | SYSTEM ERROR |
| 5 | OVERSIZED DATA |
| 6 | FORMAT MISMATCH |

FIG.14

SIGNAGE     TO PORTAL    LOGIN USER: Admin    LOGOUT

SETTINGS/REGISTRATION: MANAGEMENT SETTINGS: LICENSE/OTHERS > SIGNAGE
SIGNAGE

[ OK ] [ CANCEL ]

SIGNAGE
- ☑ DISPLAY SCREEN FOR SIGNAGE
  - CONTENTS TO BE DISPLAYED: ○ SMB
    - PATH TO FILE: `\\guest_smb\share\image.jpg`
      - * EXAMPLE OF ENTRY: \\server01\share\signage.jpg
    - USER NAME: guest
    - PASSWORD: •••••
  - ● HTTP/WebDAV
    - PATH TO FILE: `https://guest_webdav/signage.html`
      - * EXAMPLE OF ENTRY: https://webdav-server1/signage.html
    - USER NAME: user
    - PASSWORD: •••••
    - ☑ CHECK CERTIFICATE AT TIME OF TLS COMMUNICATION
      - ☑ ADD CN TO VERIFICATION ITEMS

DISPLAY TIMING
- TIMING TO DISPLAY SIGNAGE WHEN DISPLAYING AUTHENTICATION SCREEN AT TIME OF START OF OPERATION:
  - ● AFTER LOGIN
  - ○ AFTER AUTO-CLEAR

DISPLAY AT TIME OF START OF PRINT
- ☐ DISPLAY AT TIME OF START OF PRINT

DISPLAY OF ERROR MESSAGE
- ☐ DISPLAY ERROR MESSAGE ~515

HOW TO DEAL WITH ERROR
- ☑ NOTIFY ADMINISTRATOR OF ERROR BY E-MAIL ~1401

INFORMATION PROCESSING APPARATUS, CONTROL METHOD OF INFORMATION PROCESSING APPARATUS, AND STORAGE MEDIUM

BACKGROUND

Field of the Disclosure

The present disclosure relates to an information processing apparatus, a control method of the information processing apparatus, and a storage medium.

Description of the Related Art

In recent years, there has been an increasing use of "digital signage" that sends out information using a display or the like connected to a network at every location, such as outdoors, at a store, in a public space, and in a transportation facility. Also in an office of a corporation or the like, the utilization of digital signage has become a focus of attention for the purpose of support for information sharing among employees using an image processing apparatus such as a multi-function peripheral, information control in a corporation, and the like. Such a digital signage technique is advantageous in that it enables prompt and easy change of contents to distribute signage contents by performing download distribution or streaming distribution via a network. In the above-described image processing apparatus such as the multi-function peripheral also, a technique to acquire contents from a content server connected to the image processing apparatus via the network and display the acquired contents on an operation unit of the image processing apparatus.

However, there is also a case where the image processing apparatus fails in downloading from the content server or streaming reproduction of contents due to a setting error, a communication failure, or the like, and is unable to display the contents. Japanese Patent Application Laid-Open No. 2019-10787 discusses a technique of displaying on the image processing apparatus an error message that contents cannot be displayed in such a case.

However, even if the error message is displayed on the operation unit of the image processing apparatus displays as discussed in Japanese Patent Application Laid-Open No. 2019-10787, a user who sees the error message is not always able to correct an error. In a case where the image processing apparatus is used in an environment in which a general user of the image processing apparatus is unable to deal with an error, a state where an error message is displayed only because of failed display of signage contents even though other functions can be normally used is troublesome for the user. On the other hand, if the signage contents cannot be displayed normally but the error message is not issued, the occurrence of the error will be left unrecognized. Thus, in a case where the image processing apparatus is used in an environment in which a general user of the image processing apparatus is able to deal with an error, displaying an error message allows the user to deal with the error early.

SUMMARY

The present disclosure is directed to a technique of providing an image processing apparatus capable of switching between to display or not to display an error message in a case where signage contents cannot be displayed.

According to an aspect of the present disclosure, an information processing apparatus includes a memory storing instructions, and at least one processor executing the instructions causing the information processing apparatus to register information that identifies a web content, display, in a case where a predetermined condition to display the web content is satisfied, the web content identified by the registered information, determine, in a case where the predetermined condition is satisfied and an error of being unable to display the web content is detected, whether to display a screen that notifies the error, and control display of the screen that notifies the error based on the determination.

Further features of the present disclosure will become apparent from the following description of exemplary embodiments with reference to the attached drawings.

BRIEF DESCRIPTION OF THE DRAWINGS

FIGS. 5A to 5G are diagrams each illustrating a screen example of a setting screen of the image processing apparatus according to one or more aspects of the present disclosure.

FIG. 6 is a diagram illustrating an example of a content setting management table according to one or more aspects of the present disclosure.

FIGS. 9A-1 and 9A-2 to 9E are diagrams each illustrating a flow of performing content display on the operation unit according to one or more aspects of the present disclosure.

FIG. 11 is a diagram illustrating an example of a content error management table according to one or more aspects of the present disclosure.

FIGS. 12A-1 and 12A-2, and FIGS. 12B-1 and 12B-2 are diagrams each illustrating a flow of performing error display on the operation unit according to one or more aspects of the present disclosure.

FIG. 14 is a diagram illustrating a screen example of a content setting screen according to one or more aspects of the present disclosure.

DESCRIPTION OF THE EMBODIMENTS

Exemplary embodiments of the present disclosure will be described with reference to the accompanying drawings. Note that the exemplary embodiments described below is not intended to limit the claimed disclosure, and combinations of features described in the exemplary embodiments are not necessarily essential to a means for solving the issues of the present disclosure.

Figure 1:
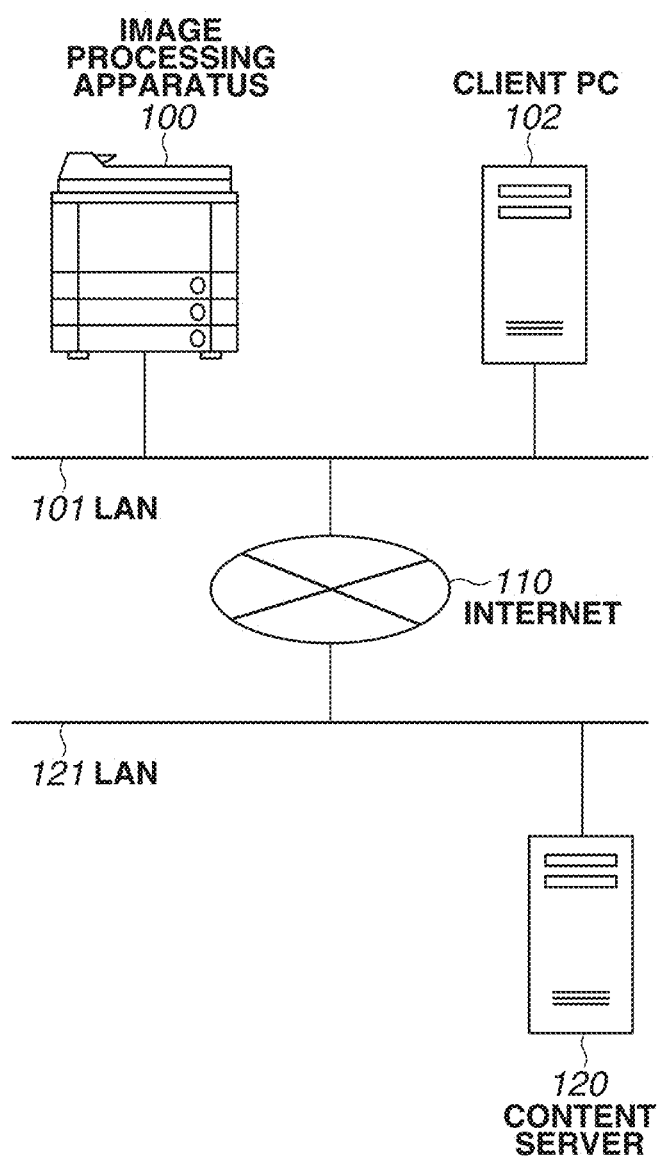
FIG. 1 is an overall view of a system according to one or more aspects of the present disclosure.

FIG. 1 is an overall view of an information processing system according to a first exemplary embodiment. An image processing apparatus 100 is connected to the Internet 110 via a local area network (LAN) 101. A client personal computer (PC) 102 is capable of communicating with the image processing apparatus 100 via the LAN 101. A content server 120 stores various kinds of contents (details will be described below) such as an advertisement and a bulletin board, and is connected to the Internet 110 via the LAN 121. The image processing apparatus 100 is capable of acquiring contents, which will be described below, from the content server 120 via the Internet 110, and displaying the contents. While the description is given of an example of a case where there are a single image processing apparatus 100, a single client PC 102, and a single content server 120, there may be a plurality of image processing apparatuses 100, a plurality of client PCs 102, and a plurality of content servers 120. The image processing apparatus 100, instead of the content server 120, may be configured to store the contents, acquire the contents from within the image processing apparatus 100, and display the contents.

Figure 2:
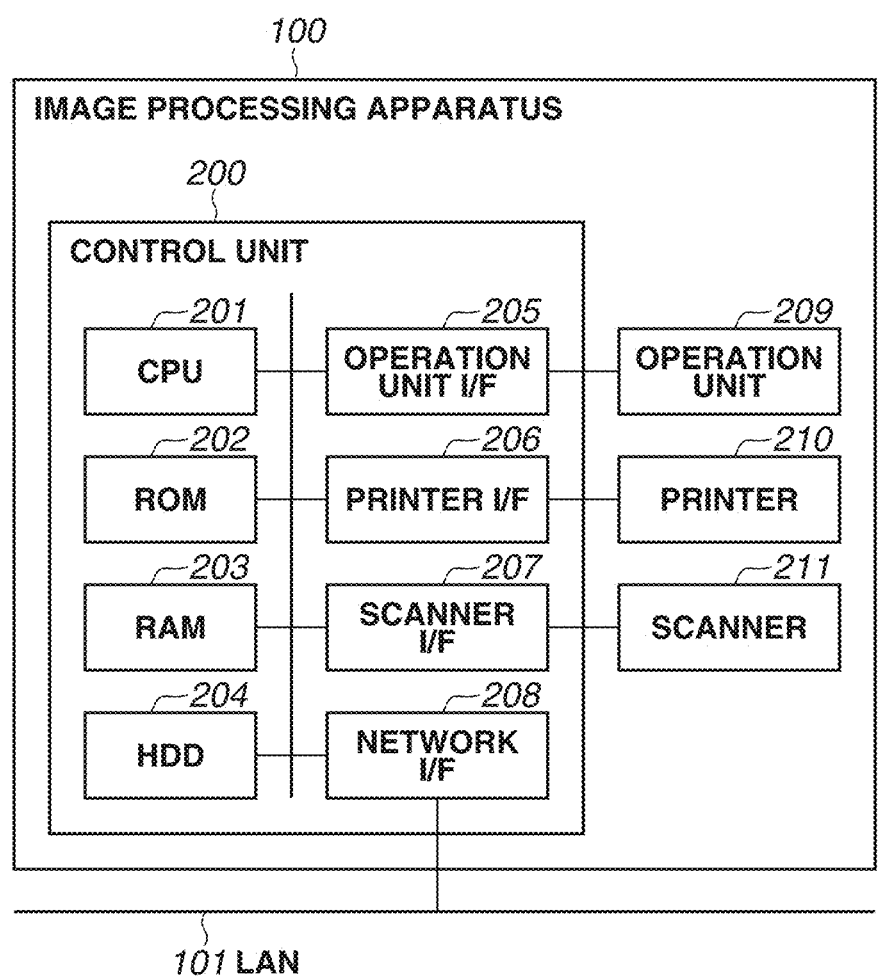
FIG. 2 is a block diagram illustrating a hardware configuration of an image processing apparatus according to one or more aspects of the present disclosure.

FIG. 2 is a block diagram illustrating a configuration of the image processing apparatus 100 according to the present exemplary embodiment. A control unit 200 including a central processing unit (CPU) 201 controls operation of the whole of the image processing apparatus 100. The CPU 201 reads out a control program stored in a read-only memory (ROM) 202, a hard disk drive (HDD) 204, or the like, and performs various kinds of control such as reading control and transmission control. The ROM 202 is a boot ROM, in which a system's boot program is stored. The RAM 203 is used as a main memory of the CPU 201 and a temporary storage area such as a work area. The HDD 204 stores image data, various kinds of programs, or various kinds of information tables. The HDD 204 is also capable of storing contents downloaded from the content server 120, such as an advertisement and a bulletin board. In a case where the image processing apparatus 100 stores contents as described above, the contents are stored in the HDD 204. An operation unit interface (I/F) 205 is an interface to connect an operation unit 209 and the control unit 200. The operation unit 209 includes a liquid crystal display unit having a touch panel function, a keyboard, and the like.

A printer I/F 206 is an interface to connect a printer 210 and the control unit 200. Image data to be printed with the printer 210 is transferred from the control unit 200 via the printer I/F 206, and printed on a recording medium (paper) with the printer 210.

A scanner I/F 207 is an interface to connect a scanner 211 and the control unit 200. The scanner 211 reads a document to generate image data, and inputs the image data to the control unit 200 via the scanner I/F 207.

A network I/F 208 is an interface to connect the control unit 200 to the LAN 101. The network I/F 208 transmits information to an external apparatus (e.g., the content server 120) connected to the Internet 110 via the LAN 101, and receives information from the external apparatus.

Representative examples of functions of the image processing apparatus 100 include the following functions.

A "copy" function of printing image data, which is generated by the scanner 211 reading an image on a document, with the printer 210

A "print" function of printing image data with the printer 210 based on a print job input from the outside such as the client PC 102

A "scan and send" function of transmitting image data, which is generated by the scanner 211 reading an image on a document, to the outside via the network I/F 208

A "scan and store" function of storing image data, which is generated by the scanner 211 reading an image on a document, in the HDD 204

A "utilize stored file" function of printing image data stored in the HDD 204 with the printer 210 or transmitting the image data to the outside via the network I/F 208

Figure 3:
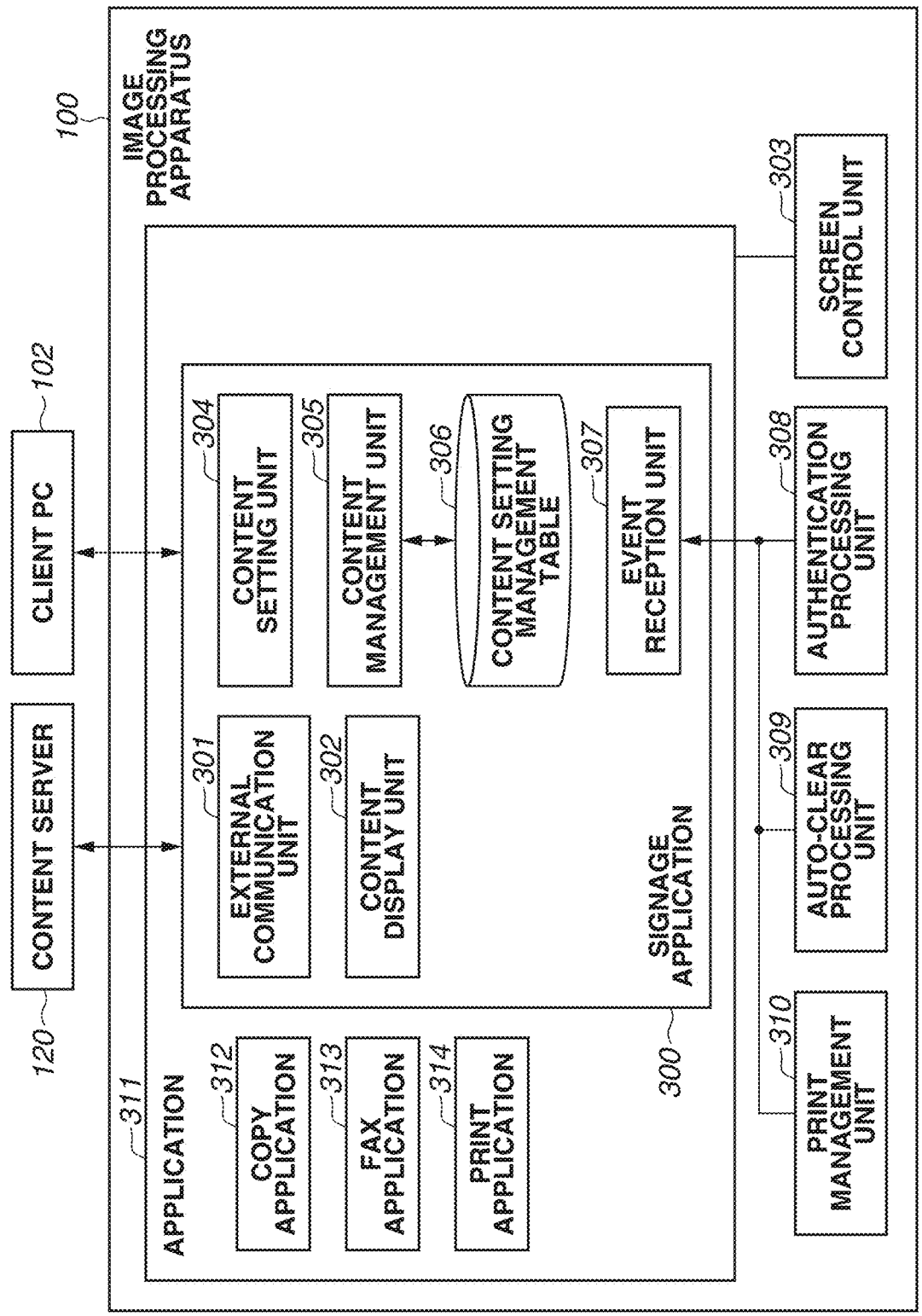
FIG. 3 is a block diagram illustrating a software configuration of the image processing apparatus according to one or more aspects of the present disclosure.

FIG. 3 is a block diagram illustrating a software configuration of the whole system including the image processing apparatus 100. Each function unit illustrated in FIG. 3 is implemented by the CPU 201 in the image processing apparatus 100 reading out a control program stored in the ROM 202 or the HDD 204 and executing the control program.

The image processing apparatus 100 includes function units such as an application 311, a screen control unit 303, an authentication processing unit 308, an auto-clear processing unit 309, and a print management unit 310.

The application 311 includes applications that use the functions of the image processing apparatus 100, such as a signage application 300, a copy application 312, a facsimile (fax) application 313, and a print application 314. The application 311 may include another application which is not illustrated. Details of the signage application 300 that displays contents acquired from the content server 120 or the like, such as an advertisement and a bulletin board, will be described below.

The signage application 300 is a built-in software program installed in the image processing apparatus 100. The signage application 300 includes an external communication unit 301, a content display unit 302, a content setting unit 304, a content management unit 305, a content setting management table 306, and an event reception unit 307.

The external communication unit 301 communicates with the content server 120, and acquires contents managed by the content server 120. Communication protocols for establishing communication between the external communication unit 301 and the content server 120 include Server Message Block (SMB), WebDAV (Web-based Distributed Authoring and Versioning), and Hypertext Transfer Protocol (HTTP). In addition, another communication protocol such as an electronic mail protocol and a file transfer protocol (FTP) may be used.

The content display unit 302 loads contents stored in the content server 120 or the HDD 204 to the RAM 203, and outputs the contents to the operation unit 209. The contents mentioned herein are data that can be browsed on a web browser, such as text data, HTML data, an image file (a Joint Photographic Experts Group (JPEG) file, a Graphics Interchange Format (GIF) file, a Portable Network Graphics (PNG) file, and a bitmap (BMP) file), and a video file. The contents are displayed when a predetermined event occurs, and functions as an electronic signboard, or a bulletin board for sharing an advertisement and information, i.e., a means for making information known.

The content setting unit 304 makes settings regarding contents to be displayed on the image processing apparatus 100. More specifically, the content setting unit 304 provides the client PC 102 with a web page for making the settings using a web server function of the image processing apparatus 100. The content setting unit 304 then accepts an instruction from a user via a setting screen displayed by a web browser of the client PC 102 to make various kinds of settings. For example, a user sets on the client PC what kind of event occurrence causes what kind of contents to be displayed. The settings made by the content setting unit 304 will be described with reference to FIGS. 5A to 5G.

FIGS. 5A to 5G are diagrams each illustrating an example of a screen for making various kinds of settings of the image processing apparatus 100 including settings regarding content display. As described above, accessing the web server of the image processing apparatus 100 using the web browser of the client PC 102 causes the client PC to display screens illustrated in FIGS. 5A to 5G.

FIG. 5A is a diagram illustrating a screen example of an authentication screen for entering authentication information. When a user enters a user name and a password via the authentication screen and presses a login button, the authentication processing unit 308 executes user authentication and login processing. In this processing, when a user with administrator's authority logs in, a screen illustrated in FIG. 5B is displayed.

Figure 5C:
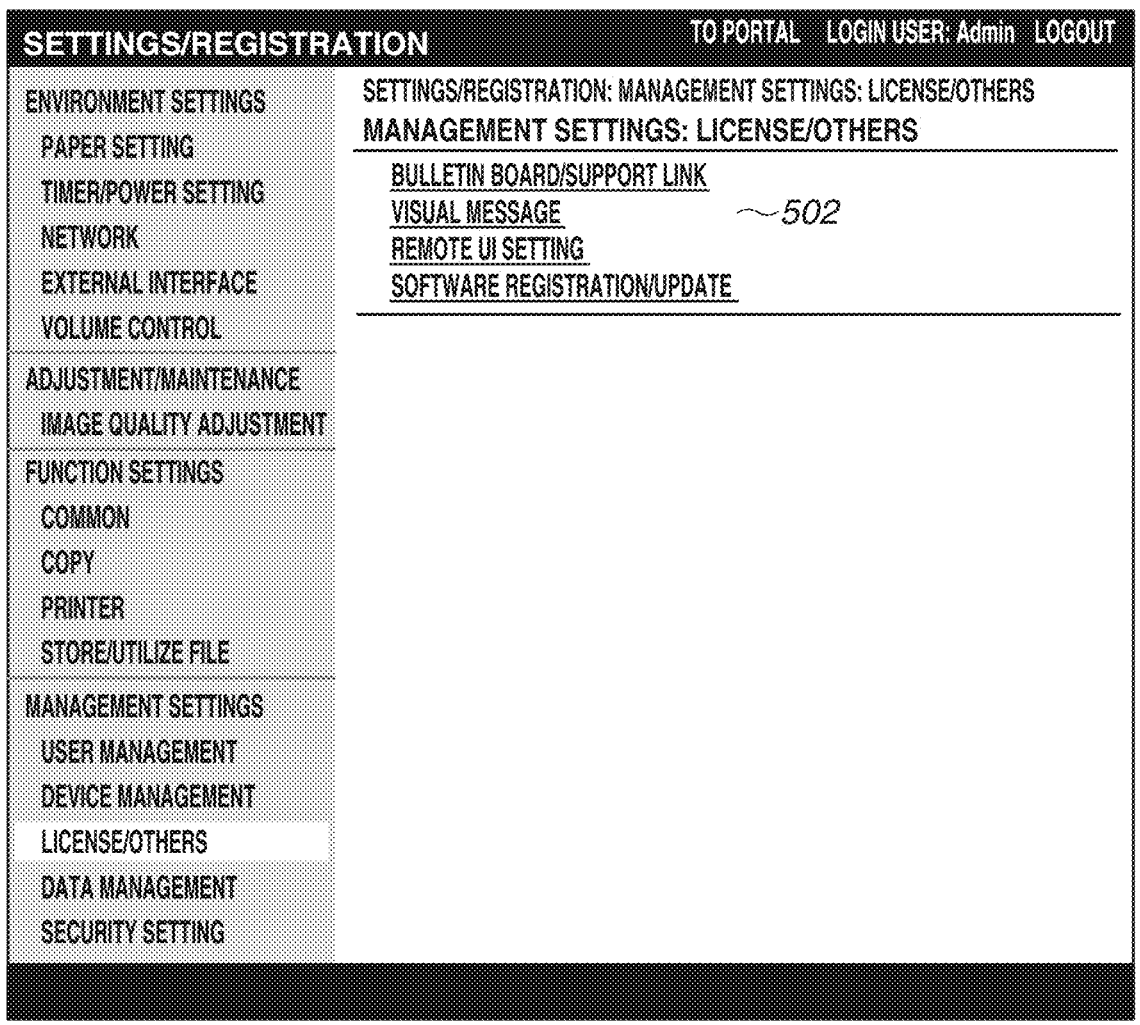

FIG. 5B is a diagram illustrating an example of a screen for allowing the user with the administrator's authority to make various kinds of settings regarding the image processing apparatus 100. When any of setting items is selected from a menu located on the left side of the screen, detailed setting items corresponding to the selected setting item are displayed on the right side of the screen. For example, when the user selects a setting item 501 of "LICENSE/OTHERS", a screen illustrated in FIG. 5C is displayed.

FIG. 5C is a diagram illustrating an example of a screen for making detailed settings regarding the license/others. Setting items including a setting item 502 are hyperlinked. When each of the setting items is selected, a web page corresponding to the selected setting item is displayed. When the user selects the setting item 502, a setting screen for the signage application 300 illustrated in each of FIGS. 5E to 5G is displayed.

Figure 5D:
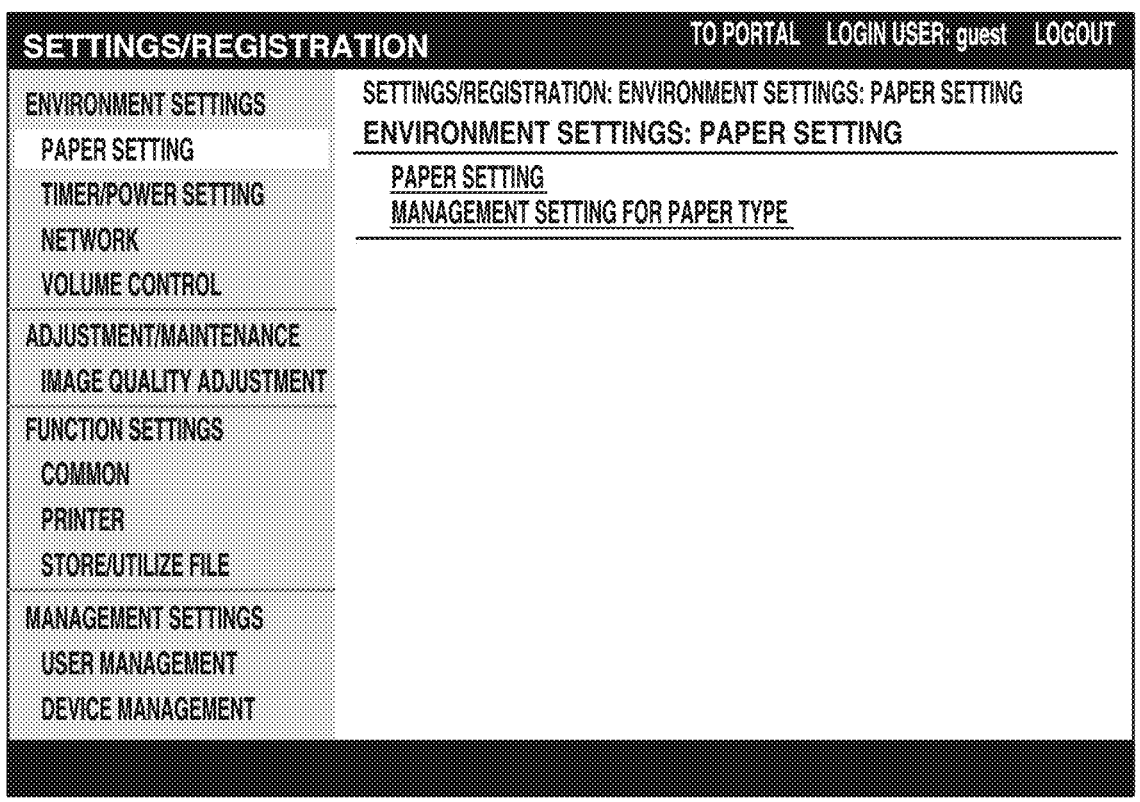

On the other hand, in a case where a user without the administrator's authority logs in in FIG. 5A, a screen illustrated in FIG. 5D is displayed.

FIG. 5D is a diagram illustrating an example of a screen for allowing the user without the administrator's authority to make various kinds of settings regarding the image processing apparatus 100. Since the setting item 501, which is displayed on the screen illustrated in FIG. 5B, is not displayed on this screen, the user without the administrator's authority is unable to display the setting screen for the signage application 300. In this manner, displaying the setting screen for the signage application 300 for only the user with the administrator's authority can restrict a user who can make settings regarding contents to an administrator. The present exemplary embodiment restricts a user who can make the settings of contents to the user with the administrator's authority over the whole of the image processing apparatus 100, but general users without the administrator's authority may be permitted to make the settings. Alternatively, an administrator's authority unique to the signage application 300 may be provided other than the administrator's authority over the whole of the image processing apparatus 100, and only a user with the administrator's authority unique to the signage application 300 may be able to make the settings of the contents.

Figure 5E:
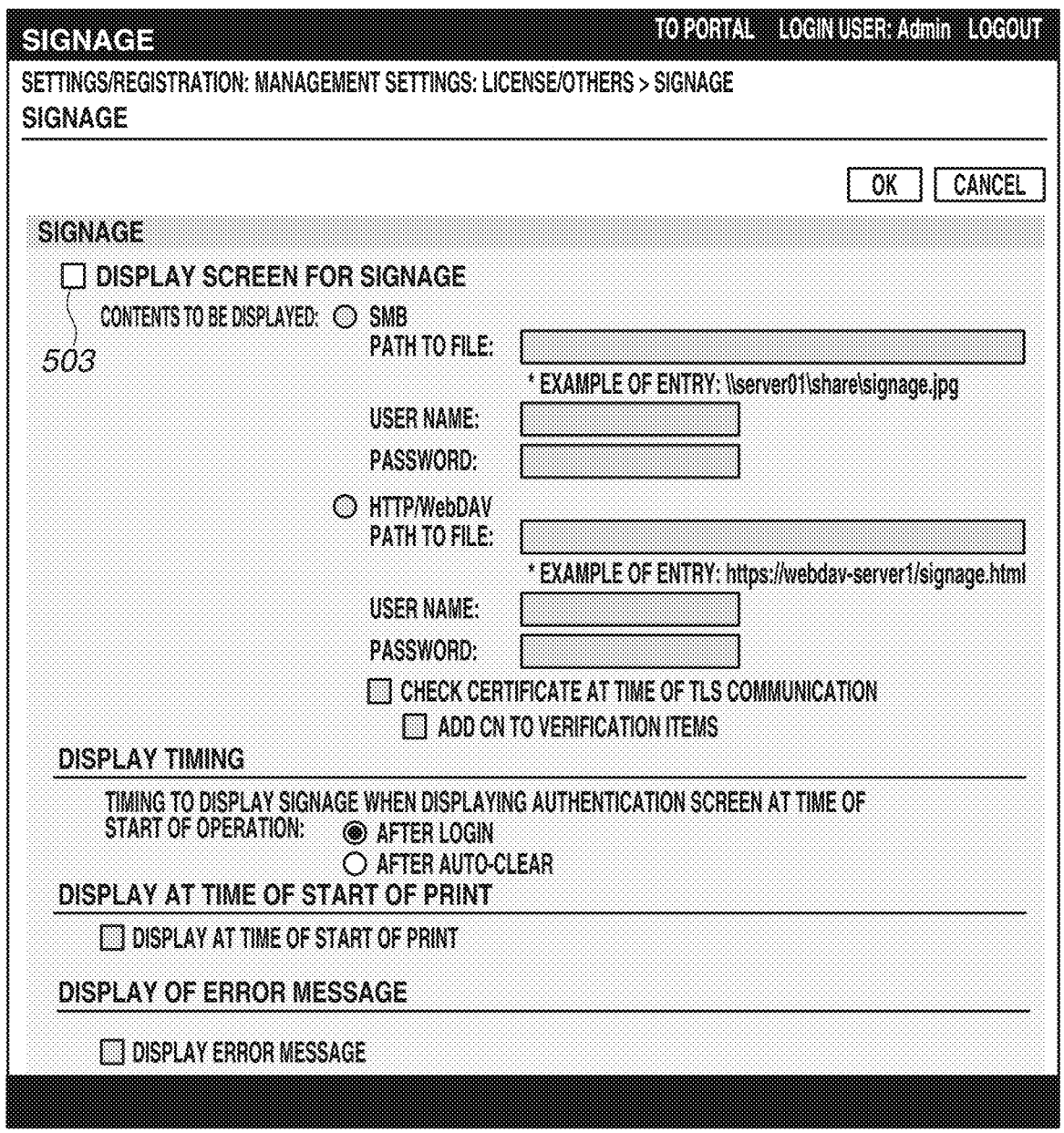
Figure 5F:
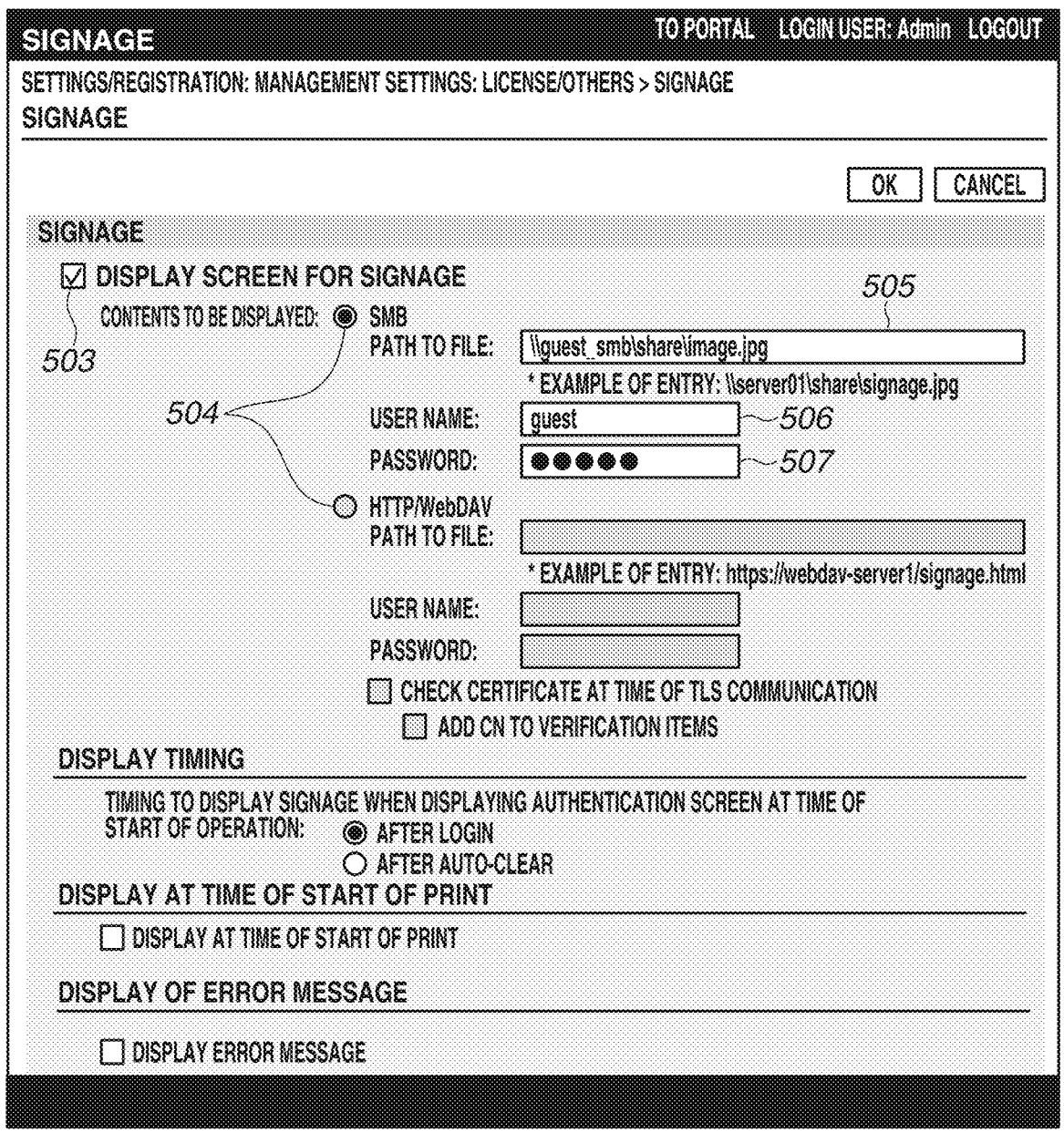
Figure 5G:
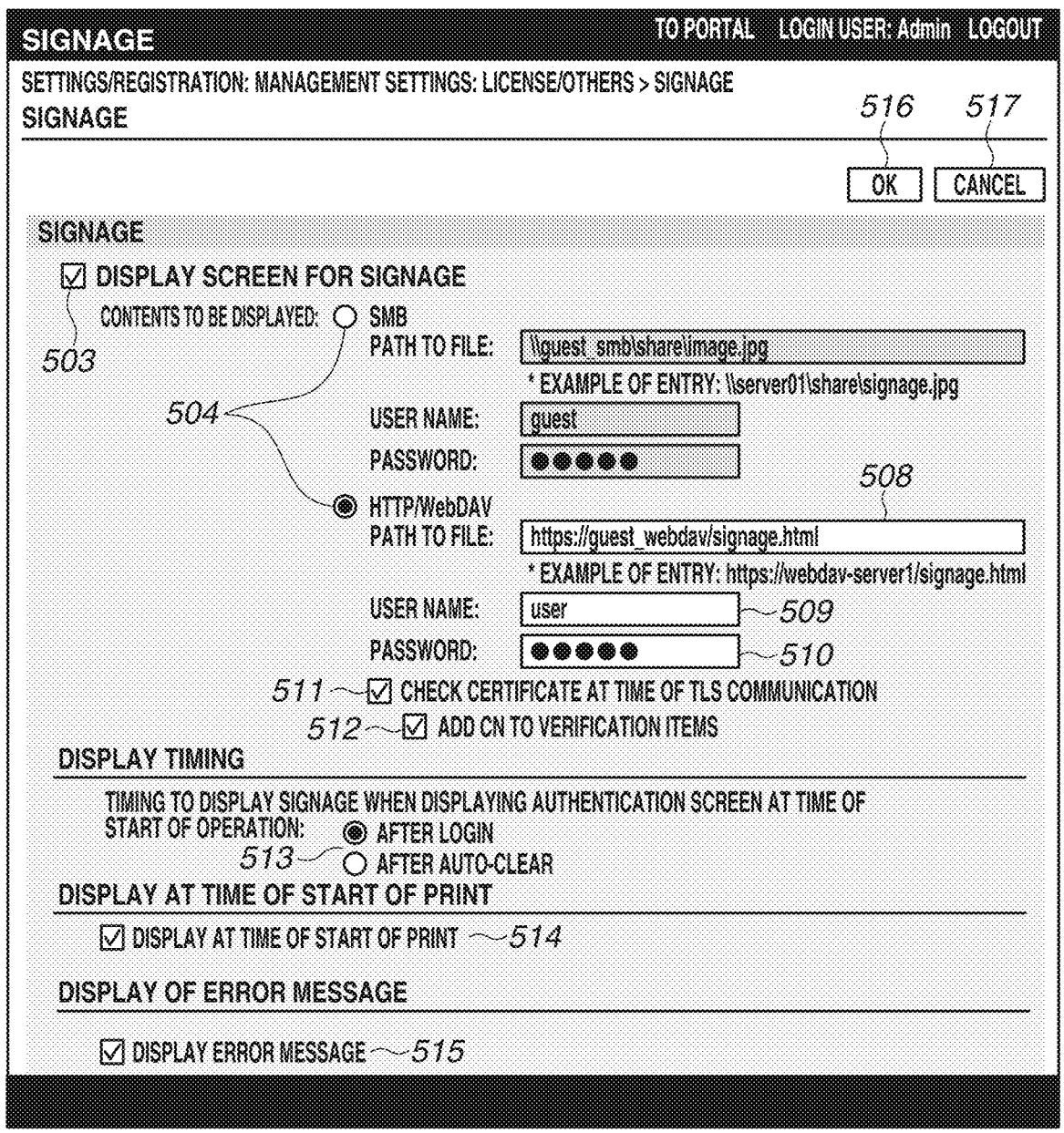

FIGS. 5E to 5G are diagrams each illustrating an example of a setting screen for the signage application 300. A check box 503 is a setting item to switch between ON and OFF of display of a screen of the signage application 300. In other words, whether to display contents can be set. In a case where the check box 503 is not checked, other setting items are grayed out as illustrated in FIG. 5E, i.e., in a state where no entry can be made. In a case where the check box 503 is checked, settable items are displayed in a non-grayed-out state as illustrated in FIG. 5G.

Radio buttons 504 are buttons to select a communication protocol between the external communication unit 301 and the content server 120. In a case where one of the radio buttons 504 for the SMB is selected, a grayed-out state of setting items regarding the SMB is canceled as illustrated in FIG. 5F, thereby allowing entry to the setting items regarding the SMB. In a case where the other of the radio buttons 504 for the HTTP/WebDAV is selected, a grayed-out state of setting items regarding the HTTP/WebDAV is canceled as illustrated in FIG. 5G, thereby allowing entry to the setting items regarding the HTTP/WebDAV.

A text box 505 is an entry field for entry of a path to a content, which permits entry when a communication protocol is set to the SMB. The path is a text string indicating a storage location of the contents, and is represented by, in the case of the SMB, a computer name, a folder name, a file name, and the like, which are separated by yen sign or backslash. As the contents, a file stored in the HDD 204 may be designated, or a file stored in the content server 120 may be designated. The text box 506 is an entry field for entry of a user name to be used for accessing the path to the contents, which permits entry when the communication protocol is set to the SMB. A text box 507 is an entry field for entry of a password to be used for accessing the path to the contents, which permits entry when the communication protocol is set to the SMB.

A text box 508 is an entry field for entry of a path to a content, which permits entry when the communication protocol is set to the HTTP/WebDAV. The path in the case of the HTTP/WebDAV is represented by a computer name, a folder name, a file name, and the like, which are separated by / (slash), to indicate a storage location of the contents. As the content, a file stored in the HDD 204 may be designated, or a file stored in the content server 120 may be designated. A text box 509 is an entry field for entry of a user name to be used for accessing the path to the content, which permits entry when the communication protocol is set to the HTTP/WebDAV. A text box 510 is an entry field for entry of a password to be used for accessing the path to the contents, which permits entry when the communication protocol is set to the HTTP/WebDAV. Check boxes 511 and 512 are setting items regarding encryption communication when the communication protocol is set to the HTTP/WebDAV.

Radio buttons 513 are items allowing a setting of a timing to display a content. The radio buttons 513 are buttons to set a timing to display the content in a case where a setting to display an authentication screen at the time of start of a user's operation of the image processing apparatus 100 is made, which will be described with reference to FIGS. 7A to 7D. In a case where one of the radio buttons 513 for "AFTER LOGIN" is selected, the authentication screen is displayed at the operation start time, and the content is displayed after login processing is performed. In a case where the other of the radio buttons 513 for "AFTER AUTO-CLEAR" is selected, the content is displayed after auto-clear. The radio buttons 513 are not necessarily in the form of radio buttons, and may alternatively be check boxes and the like that permit selection of both "AFTER LOGIN" and "AFTER AUTO-CLEAR".

A check box 514 is a setting item to switch between ON and OFF of a function of performing content display during execution of print processing. Since the execution of print takes time, it is possible to set whether to perform content display while a user, who has instructed execution of print, is waiting for completion of print. In a case where the check box 514 is checked, the image processing apparatus 100 performs content display at the time of execution of print.

Figure 10:
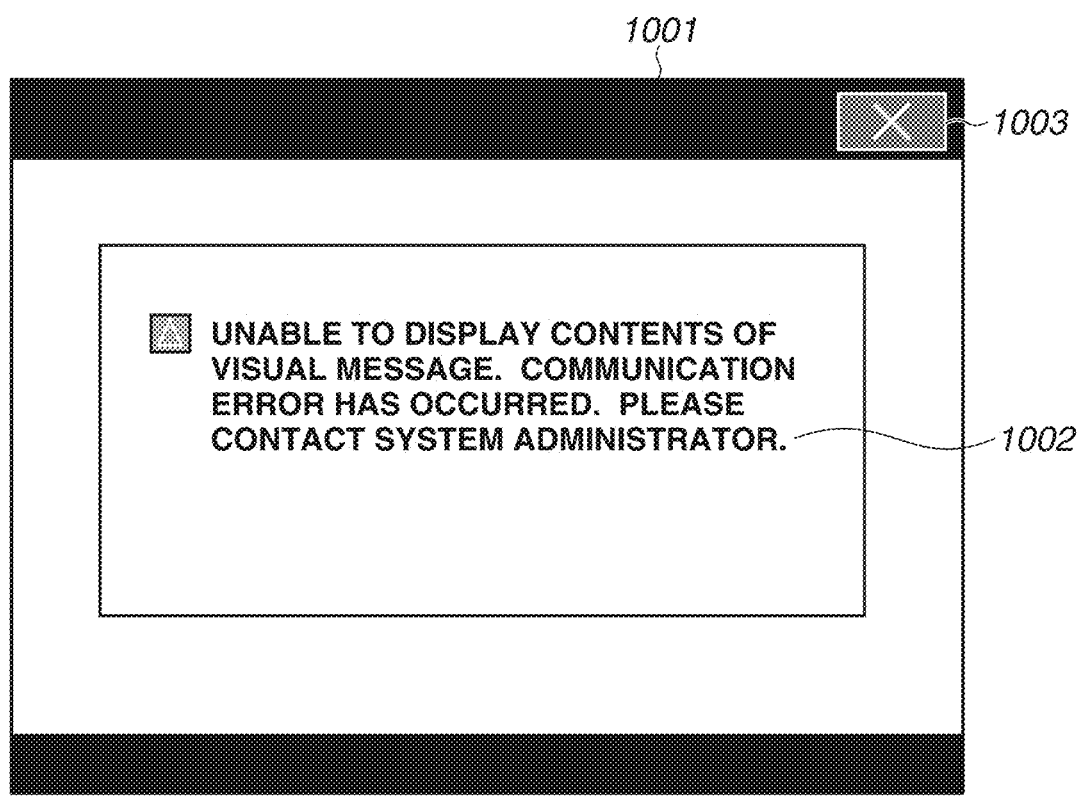
FIG. 10 is a diagram illustrating a screen example of an error screen according to one or more aspects of the present disclosure.

A check box 515 illustrated in FIG. 5G is a setting item to switch between whether to display an error screen 1001 in FIG. 10 on the image processing apparatus 100 in a case where an error of being unable to display a content. In a case where the check box 515 is checked, an error screen is displayed on the operation unit 209 when a content display error is detected. On the other hand, in a case where the check box 515 is not checked, the error screen is not displayed on the operation unit 209 when the content display error is detected.

An OK button 516 is a button for storing the settings made in the items 503 to 515 in the content setting management table 306. When the OK button 516 is pressed, the settings made in the items 503 to 515 are stored in the content setting management table 306, and the screen returns to the screen illustrated in FIG. 5C. A cancel button 517 is a button for returning to the screen illustrated in FIG. 5C without storing the settings made in the items 503 to 515 in the content setting management table 306.

In this manner, a user can set and register, via the setting screens illustrated in FIGS. 5A to 5G, setting information to be used by the signage application 300 to display the content. While the description has been given of the example of making the settings regarding content display from the client PC 102, a user may be able to make the settings using the operation unit 209 of the image processing apparatus 100.

Referring back to FIG. 3, the content management unit 305 stores the setting contents such as the path to the content set by the content setting unit 304 in the content setting management table 306. In addition, the content management unit 305 acquires the settings stored in the content setting management table 306, and gives notification to the content display unit 302.

The content setting management table 306 is a management table for managing setting values of the signage application 300 set by the content setting unit 304.

FIG. 6 is a diagram illustrating an example of the content setting management table 306. FIG. 6 illustrates the content setting management table 306 that is generated and updated based on the settings based on the entry illustrated in FIG. 5G.

A column of keys 601 indicates keys corresponding to respective setting items of the signage application 300.

A column of setting values 602 indicates values corresponding to respective setting items of the signage application 300.

A row of a key 603 is an item that indicates ON/OFF of screen display of the signage application 300. A value corresponding to this item (in the column of the setting values 602) being 0 indicates that the screen display is OFF, and a value corresponding to this item being 1 indicates the screen display is ON. When the setting of the check box 503 illustrated in FIGS. 5E to 5F is updated, this value is also updated.

A row of a key 604 is an item that indicates the communication protocol between the external communication unit 301 and the content server 120. A value corresponding to this item being 0 indicates the SMB, and a value corresponding to this item being 1 indicates the HTTP/WebDAV. When the setting of the radio buttons 504 illustrated in FIGS. 5E to 5F is updated, this value is also updated.

A row of a key 605 is an item that indicates a path to a content when the communication protocol is set to the SMB. When the setting of the text box 505 illustrated in FIGS. 5E to 5F is updated, this value is also updated.

A row of a key 606 is an item that indicates a user name to be used for accessing the path to the content when the communication protocol is set to the SMB. When the setting of the text box 506 illustrated in FIGS. 5E to 5F is updated, this value is also updated.

A row of a key 607 is an item that indicates a password to be used for accessing the path to the content when the communication protocol is set to the SMB. When the setting of the text box 507 illustrated in FIGS. 5E to 5F is updated, this value is also updated.

A row of a key 608 is an item that indicates a path to a content when the communication protocol is set to the HTTP/WebDAV. When the setting of the text box 508 illustrated in FIGS. 5E to 5F is updated, this value is also updated.

A row of a key 609 is an item that indicates a user name to be used for accessing the path to the contents when the communication protocol is set to the HTTP/WebDAV. When the setting of the text box 509 illustrated in FIGS. 5E to 5F is updated, this value is also updated.

A row 610 is an item that indicates a password to be used for accessing the path to the contents when the communication protocol is set to the HTTP/WebDAV. When the setting of the text box 510 illustrated in FIGS. 5E to 5F is updated, this value is also updated.

A row of a key 611 and a row of a key 612 are items each indicating a setting regarding encryption communication when the communication protocol is set to the HTTP/WebDAV. A value corresponding to each item being 0 indicates that a corresponding setting is not selected, and a value corresponding to each item being 1 indicates that the corresponding setting is selected. When the settings of the check boxes 511 and 512 illustrated in FIGS. 5E to 5F are updated, the respective values are also updated.

A row of a key 613 is an item that indicates a setting of a timing to display signage (content). A value corresponding to the item being 0 indicates that "AFTER AUTO-CLEAR" is selected, a value corresponding to the item being 1 indicates that "AFTER LOGIN" is selected, and a value corresponding to the item being 3 indicates that both "AUTO-CLEAR" and "AFTER AUTO-CLEAR" are selected. When the setting of the radio buttons 513 illustrated in FIGS. 5E to 5F is updated, this value is also updated.

A row of a key 614 is an item that indicates a setting of whether to display contents at the time of execution of print. When the setting of the check box 514 illustrated in FIGS. 5E to 5F is updated, this value is also updated.

A row of a key 615 is an item that indicates ON/OFF of display of an error screen when a content display error is detected. A value corresponding to the item being 0 indicates that the display of the error screen is OFF, and a value corresponding to the item being 1 indicates that the display of the error screen is ON. When the setting of the check box 515 illustrated in FIGS. 5E to 5F is updated, this value is also updated.

Referring back to FIG. 3, the content management unit 305 refers to the content setting management table 306 based on the keys 601 to acquire the setting values 602 corresponding to the respective setting items.

The copy application 312 enables high-speed and high-quality copy with the usage of a high-resolution scanner and a printer capable of high-speed print. Additionally, the copy application 312 enables copy of a large amount of documents by consecutive reading with the usage of a hard disk installed in a control apparatus unit. Furthermore, the copy application 312 enables cascade copy by transmission of scanned image data to a plurality of image processing apparatuses via the network.

The fax application 313 enables not only transmission/reception of fax through group 3 (G3) facsimile or group 4 (G4) facsimile, but also transfer of the received fax data by converting the fax data into data in an electronic mail protocol or the like with the usage of a transfer function. In addition, the fax application 313 enables Internet fax for transmission/reception of fax with the usage of the Internet, instead of a conventional telephone line.

The print application 314 has a function capable of receiving print data transmitted from a host computer in page description language (PDL), such as PostScript and LBP Image Processing (LIPS), and performing high-speed print on paper. In addition, the print application 314 can receive BMLinks®, which is a common format of various printers, from the outside, to perform printing on paper. Furthermore, the print application 314 can receive application data in Portable Document Format (PDF) or the like directly from the outside bypassing a printer driver to perform print on paper.

The event reception unit 307 receives various kinds of event information notified by the authentication processing unit 308, the auto-clear processing unit 309, and the print management unit 310. In addition, an event may be notified by another module (not illustrated).

The authentication processing unit 308 causes the operation unit 209 and the client PC 102 to display an authentication screen, and executes user authentication using authentication information entered by a user such as a user identification (ID) and a password. In a case where the user authentication has succeeded, the authentication processing unit 308 executes login processing to allow the user to log into the image processing apparatus 100. When a logout instruction is given, the authentication processing unit 308 executes logout processing for the login user to log out from the image processing apparatus 100. The logout instruction is issued when a logout button displayed on the operation unit 209 is pressed by the user or auto-clear processing, which will be described below, is executed. When the login processing or the logout processing is performed, the authentication processing unit 308 transmits to the event reception unit 307 an event (login event or logout event) indicating the execution of corresponding processing. In addition, the authentication processing unit 308 performs control of a timing to display the authentication screen based on a display setting of the authentication screen as described below.

The auto-clear processing unit 309 executes auto-clear processing in a case where an operation to the operation unit 209 is not performed for a predetermined time period (the "predetermined time period" is hereinafter referred to as a "transition time to auto-clear"). The auto-clear processing is processing to clear a setting value/setting state on a displayed screen and set an initial value. For example, when a user is away from a location in front of the image processing apparatus 100 in the midst of making settings via a copy screen for making various kinds of settings regarding copy, and the transition time to auto-clear elapses with this state, setting values that have yet to be confirmed are cleared and default setting values are set. At this time, in a case where the user has logged into the image processing apparatus 100, the image processing apparatus 100 executes the auto-clear processing to cause the user to automatically log out from the image processing apparatus 100. An auto-clear function can prevent, for example, execution of copy or the like with an unexpected setting of the image processing apparatus 100 unintentionally taking over a setting state of a user who has used the image processing apparatus 100 immediately before, and exposure of set contents that are not supposed to be shown to the next user. In a case of executing the auto-clear processing, the auto-clear processing unit 309 transmits an auto-clear event to the event reception unit 307. In addition, in the case of executing the auto-clear processing, the authentication processing unit 308 executes logout processing to cause the login user to log out from the image processing apparatus 100. The transition time to auto-clear can be freely set by the user.

In addition, it is possible to set a transition screen at the time of execution of the auto-clear processing. In a case where an initial screen is set as the transition screen at the time of execution of auto-clear, a currently displayed screen of the operation unit 209 is switched to the initial screen. The initial screen is a screen preliminarily set by a user as a screen to be displayed at the time of start of the image processing apparatus 100. For example, a main menu screen for selecting a function to be used from a plurality of functions of the image processing apparatus 100 and an application, or an application screen can be set as the initial screen. A description will be given below of an example in which the initial screen is set as the transition screen at the time of execution of auto-clear, and the main menu screen is set as the initial screen.

The screen control unit 303 outputs screens managed for each application, the main menu screen, and the like to the operation unit 209.

The print management unit 310 performs a start operation of a print job. In addition, the print management unit 310 notifies the event reception unit 307 of the start of the print job.

The authentication processing unit 308, the auto-clear processing unit 309, the screen control unit 303, and the print management unit 310 are common processing/management units for applications included in the application 311, and may cooperate with one another. In addition, there may be another common management unit or another common processing unit, which is not illustrated.

FIGS. 7A to 7D are diagrams each illustrating an example of a screen displayed by the screen control unit 303 to make settings regarding user authentication of the image processing apparatus 100. Assume that setting screens illustrated in FIGS. 7A to 7D are screens that can be displayed only when a user with administrator's authority logs in.

Figure 7A:
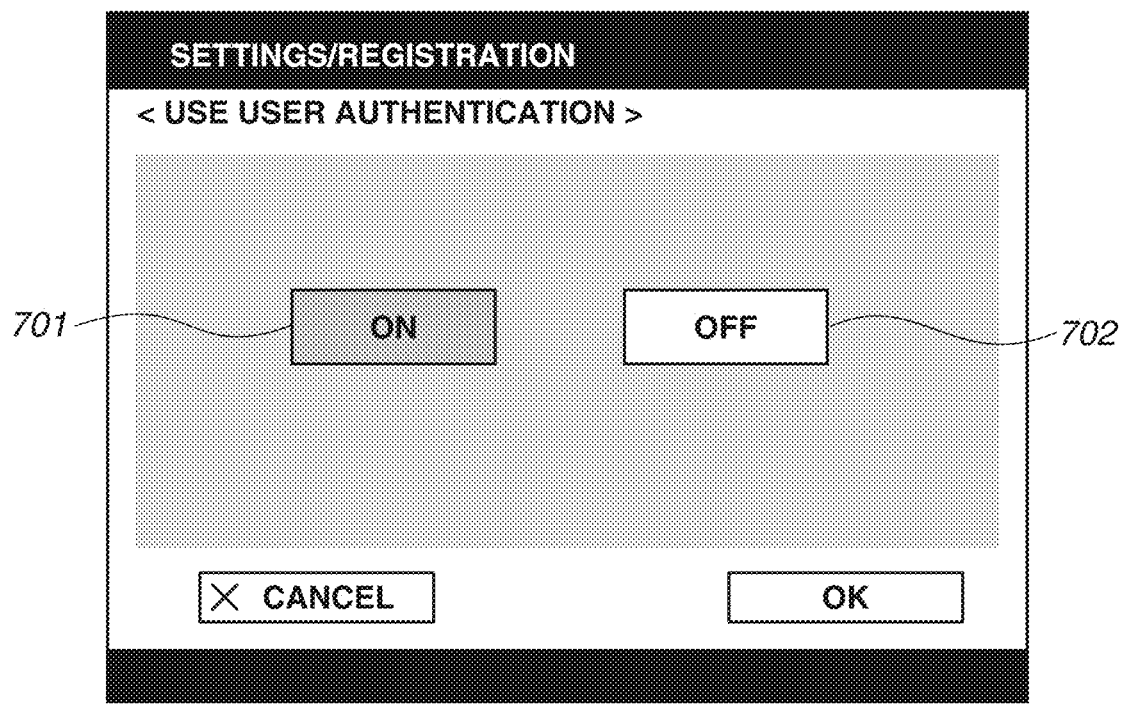
FIGS. 7A to 7D are diagrams each illustrating an example of a screen for making settings regarding user authentication according to one or more aspects of the present disclosure.

FIG. 7A illustrates a screen for setting whether to use the image processing apparatus 100 under an environment requiring the user authentication. A button 701 is a button for enabling the user authentication. In a case where this button is selected, the user authentication is required to use each function of the image processing apparatus 100. A button 702 is a button for disabling the user authentication. In a case where this button is selected, each function of the image processing apparatus 100 can be used without the user authentication.

Figure 7B:
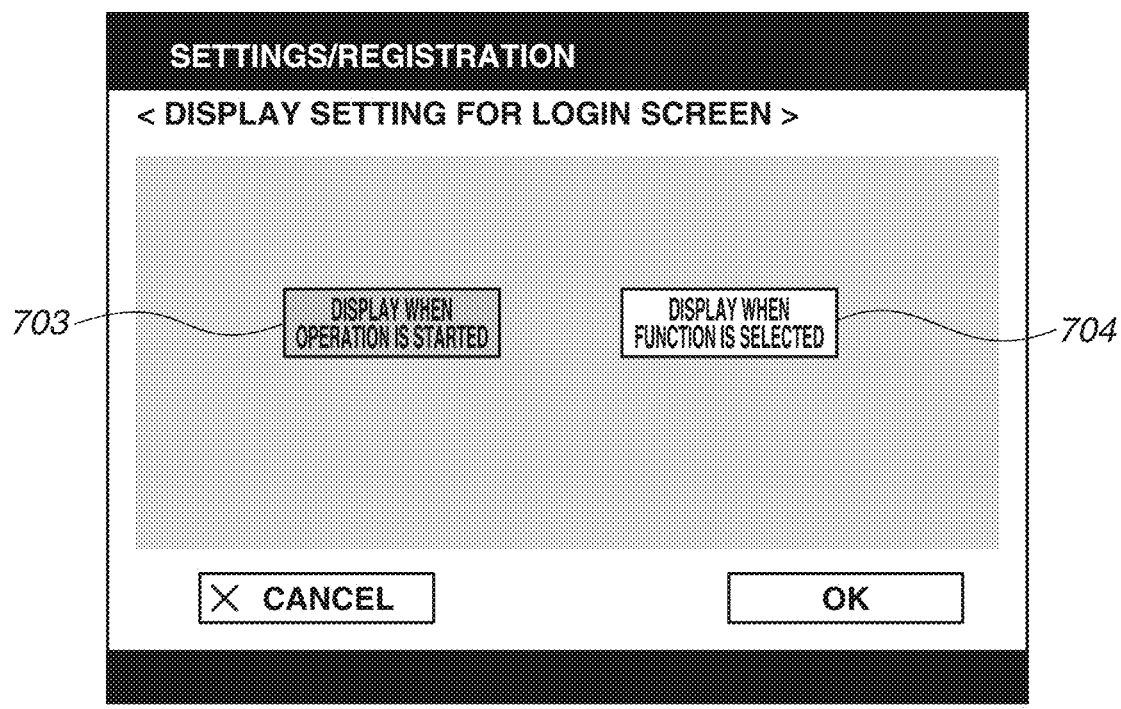
Figure 7C:
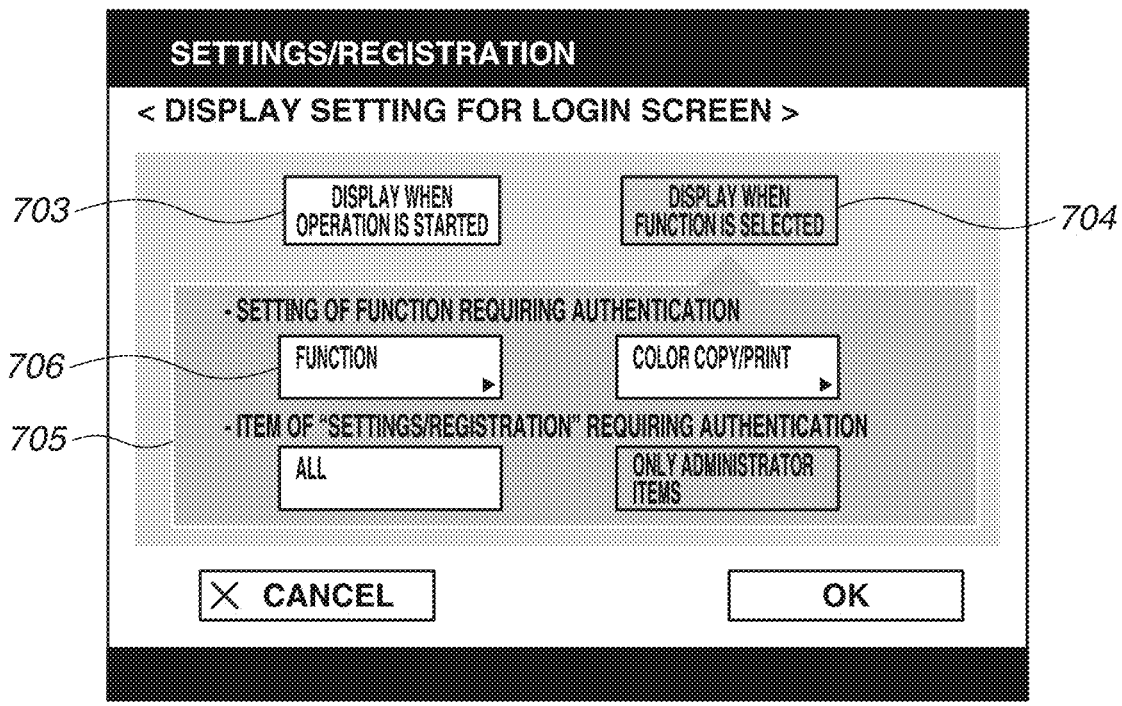

FIGS. 7B and 7C each illustrate a screen for setting a timing to display an authentication screen. Timings to execute the user authentication and the login processing are determined based on the settings made via this screen. FIG. 7B illustrates a screen in a case where the button 703 is selected, and FIG. 7C illustrates a screen in a case where the button 704 is selected.

The button 703 is a button for making a setting to display the authentication screen at the time of start of a user's operation of the image processing apparatus 100 (e.g., before the main menu is displayed). In a case where this button is selected, the authentication screen is displayed when the user starts the operation, and the user authentication is required. In other words, the user authentication is required at the beginning when a user uses whatever function of the image processing apparatus 100 or whatever application.

The button 704 is a button for making a setting to display the authentication screen when a specific function of the image processing apparatus 100 or an application is selected. When the button 704 is pressed, a screen 705 for selecting a function or the like that requires the user authentication is popped up. When a button 706 is selected on this screen, the screen is switched to a screen illustrated in FIG. 7D.

Figure 7D:
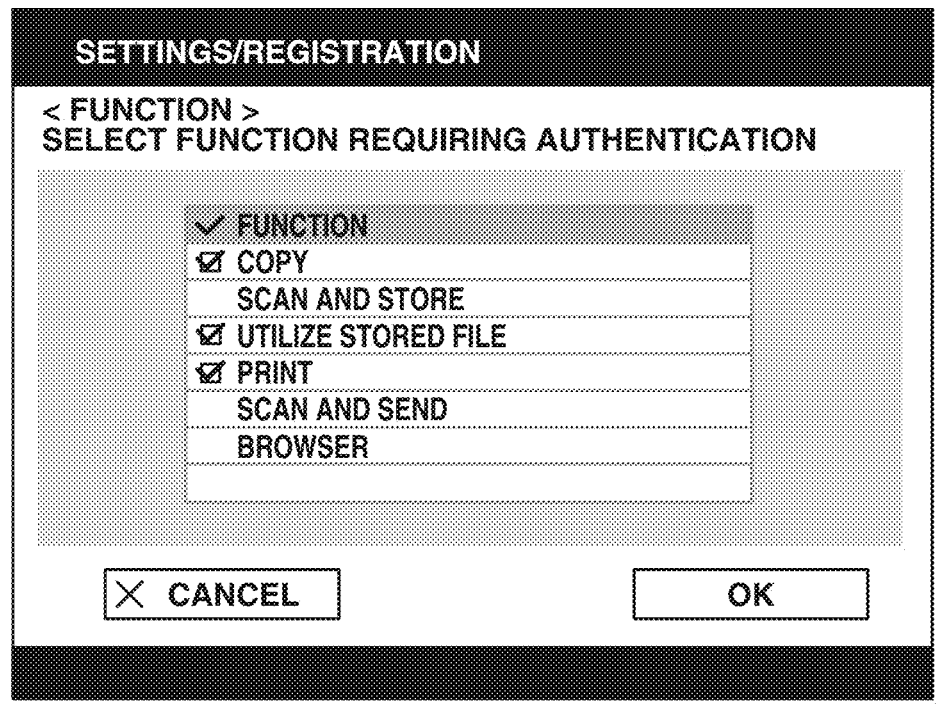

FIG. 7D is a screen for selecting a function that requires the user authentication from a plurality of functions of the image processing apparatus 100. As for the function selected, via the screen illustrated in FIG. 7D, as a function that requires the user authentication, the authentication screen is displayed when this function is used. On the other hands, a function not selected as the function that requires the user authentication can be used without the user authentication. In FIG. 7D, each function of "COPY", "UTILIZE STORED FILE", and "PRINT" is selected as the function that requires the user authentication. On the other hand, each function of "SCAN AND STORE", "SCAN AND SEND", and "BROWSER" is the function that requires no user authentication. In this manner, in a case where the button 704 is selected, the authentication screen is not displayed at the operation start time of the image processing apparatus 100. When a user uses each function, the authentication screen is displayed depending on a selected function, and the user authentication is required.

Figure 8:
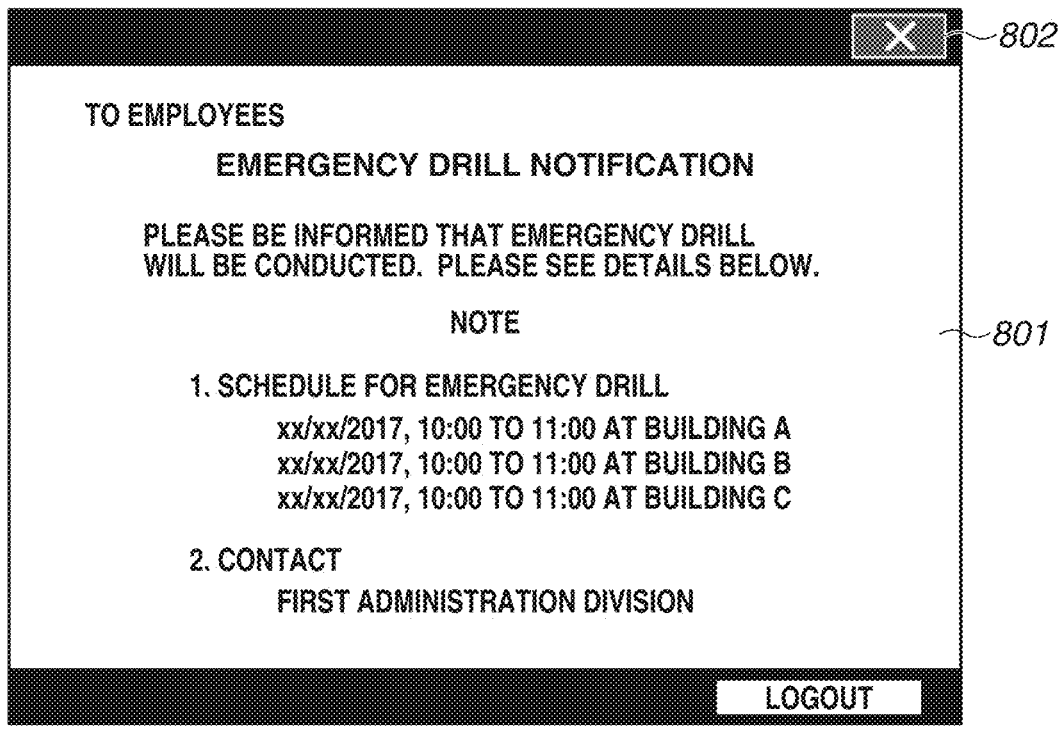
FIG. 8 is a diagram illustrating a screen example when contents are displayed on an operation unit according to one or more aspects of the present disclosure.

FIG. 8 is a diagram illustrating an example of a screen of the image processing apparatus 100 when preliminarily registered web contents are displayed by the signage application 300. Web contents displayed on a screen 801 are web contents that have been acquired by the content server 120. On this screen, an HTML file indicated as "https://guest_webdav/signage.html" is displayed with reference to the content setting management table 306 illustrated in FIG. 6. When the user presses a close button 802, the screen 801 are hidden. An emergency drill notification is displayed in FIG. 8. In this manner, registering an item to be notified to employees as web contents and displaying the web contents on the image processing apparatus 100 using the signage application 300 enables utilization of the web contents for support for information sharing among employees, information control in a corporation, and the like.

Subsequently, a timing to display web contents will be described. As described above, the flow of screens to be displayed is different depending on the settings regarding the timing to display web contents and the timing to execute the user authentication made via the setting screens illustrated in FIGS. 5A to 5G, and FIGS. 7A to 7D. In the present exemplary embodiment, to effectively utilize the image processing apparatus 100 as signage, the image processing apparatus 100 is configured to display web contents at an appropriate timing corresponding to the settings in consideration of the difference in the flow of screens.

FIGS. 9A-1 and 9A-2 to 9E are diagrams each illustrating a flow of screens to be displayed on the operation unit 209 in a case where the display of the signage application 300 is set to ON (the check box 503 is checked). FIGS. 9A-1 and 9A-2 to FIGS. 9C-1 and 9C-2 each illustrate a flow of screens displayed in a case where the button 701 is selected on the screen illustrated in FIG. 7A, i.e., the flow of screens in a case where a user authentication function is set to ON.

Figures 1, 9A:
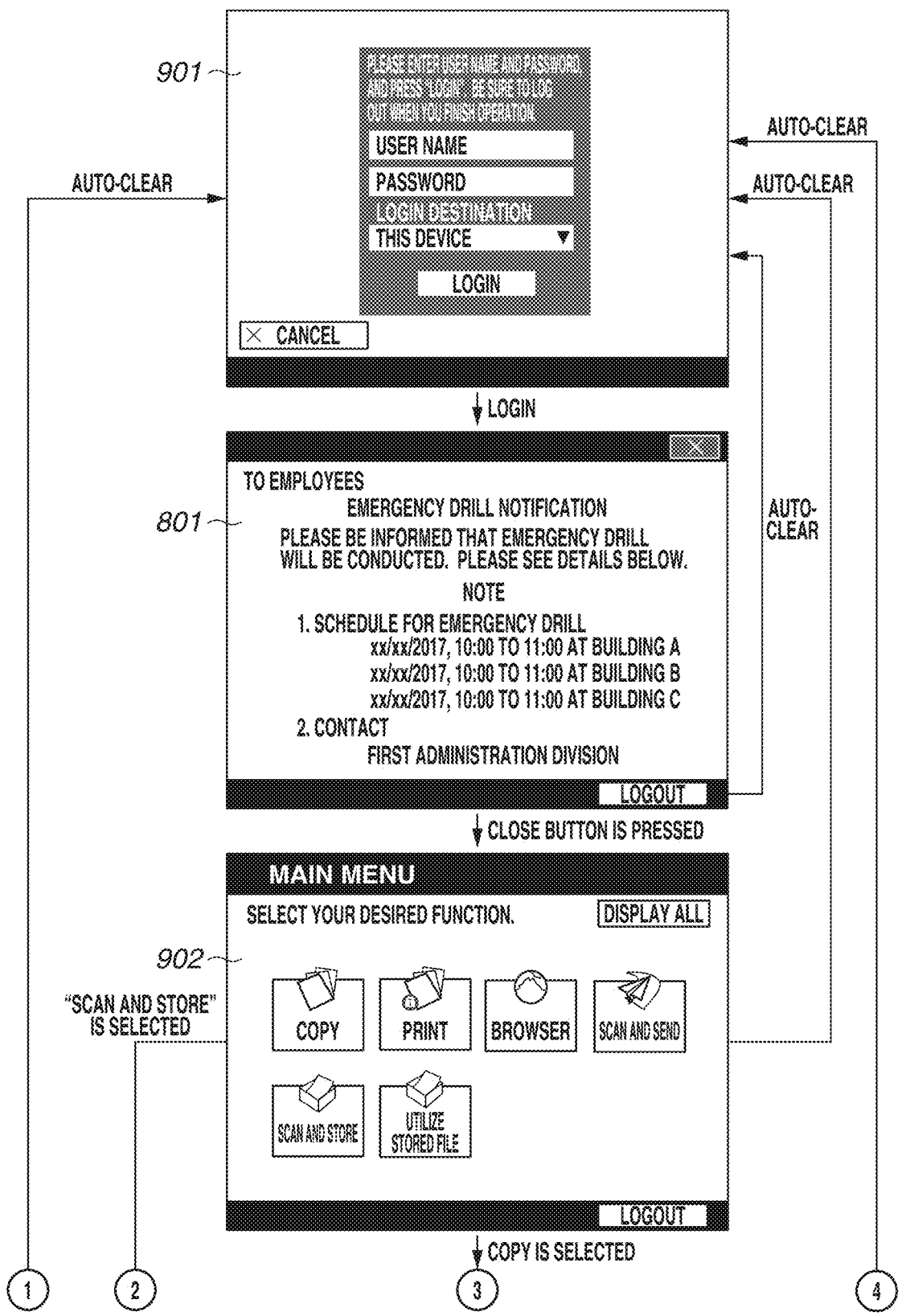
Figures 2, 9A:
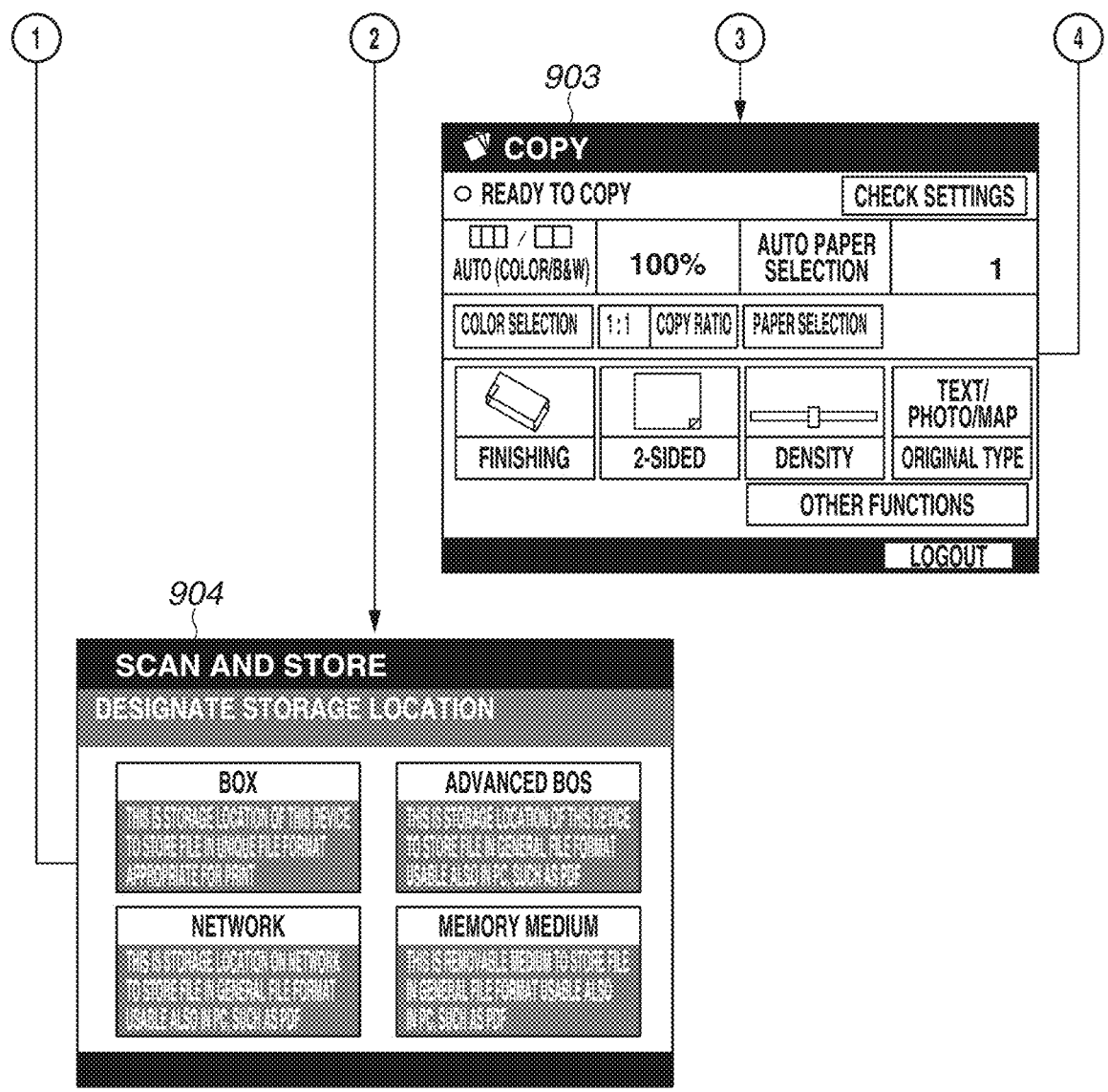

FIGS. 9A-1 and 9A-2 are diagrams illustrating a flow of screens displayed in a case where the button 703 is selected on the screen illustrated in FIG. 7B, i.e., the flow of screens displayed in a case where the setting to display the authentication screen at the operation start time is made. In addition, the flow of screens illustrated in FIGS. 9A-1 and 9A-2 are the flow of screens displayed in a case where one of the radio buttons 513 for "AFTER LOGIN" is selected on the screen illustrated in FIGS. 5E to 5G. If the user authentication succeeds based on the authentication information entered by a user via an authentication screen 901 and the login processing is completed, the screen 801 of the signage application 300 is displayed. This screen 801 is identical to the screen illustrated in FIG. 8. When a close button on the upper right of the screen is pressed, the screen 801 is hidden, and a main menu screen 902 is displayed. When a "COPY" button is operated on the main menu screen 902, the main menu screen 902 transitions to a copy setting screen 903. When a "SCAN AND STORE" button is operated on the main menu screen 902, the main menu screen 902 transitions to a scan and store setting screen 904.

In this manner, in a case where the setting to display the authentication screen at the operation start time is made and the setting to display web contents after login is made, web contents are displayed by the signage application 300 at a timing when the login of the user is completed. With the settings, the web contents are displayed when a user starts to use the image processing apparatus 100, which can draw attention of the user, and can thereby effectively make the user known about a notification item in a corporation or the like.

Figures 1, 9B:
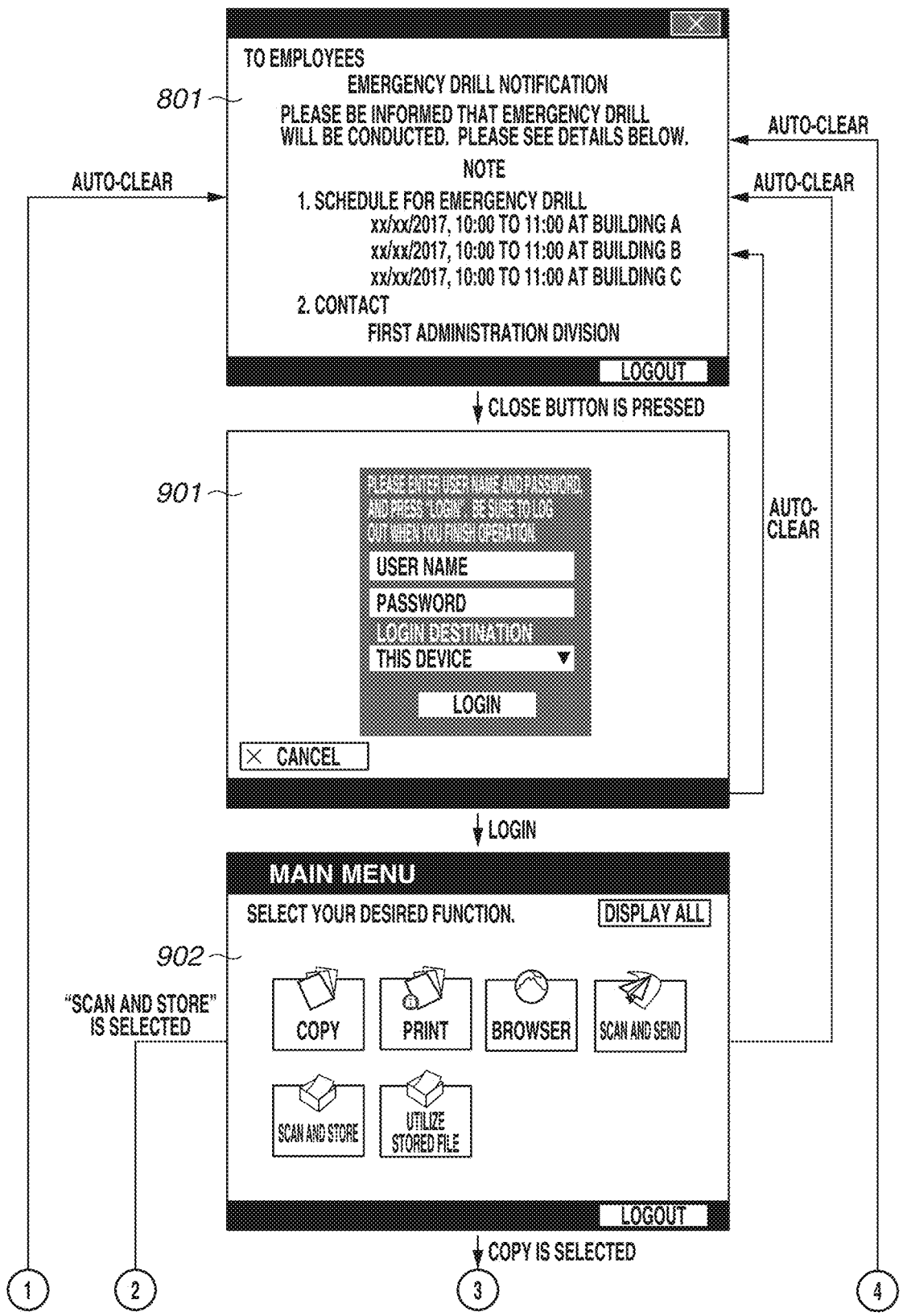
Figures 2, 9B:
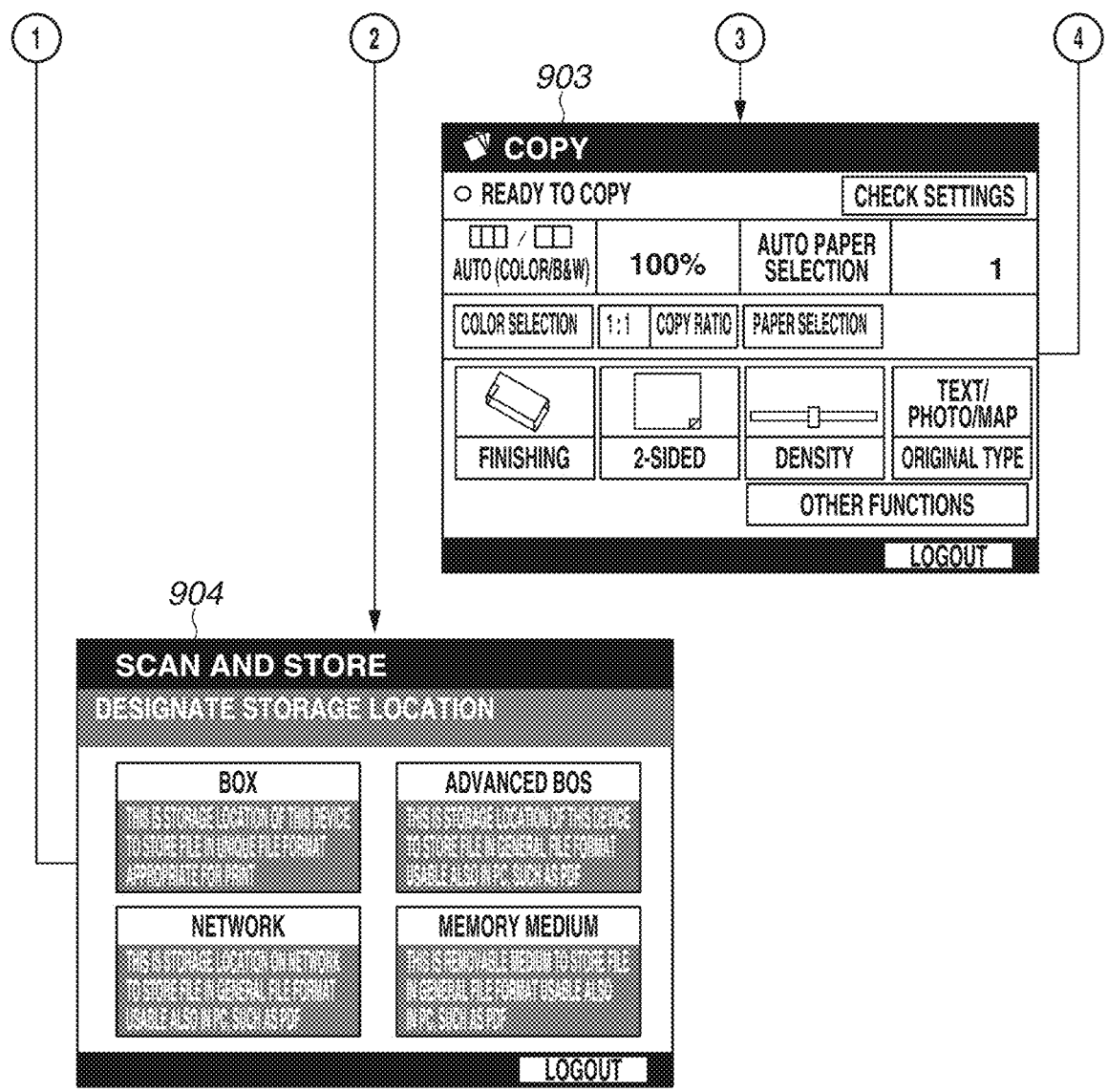

FIGS. 9B-1 and 9B-2 are diagrams illustrating a flow of screens displayed in a case where the button 703 is selected on the screen illustrated in FIG. 7B, i.e., in a case where the setting to display the authentication screen at the operation start time is made. In addition, the flow of screens illustrated in FIGS. 9B-1 and 9B-2 is the flow of screens in a case where one of the radio buttons 513 for "AFTER AUTO-CLEAR" is selected on the screen illustrated in FIGS. 5E to 5G. In comparison with the screens illustrated in FIGS. 9A-1 and 9A-2, if the transition time to auto-clear elapses without a user's operation on the operation unit 209 and the auto-clear processing is executed, the screen 801 of the signage application 300 is displayed. When the close button on the upper right of the screen is pressed, the screen 801 is hidden, and the authentication screen 901 is displayed. This screen 801 is identical to the screen illustrated in FIG. 8. If the user authentication succeeds based on the authentication information entered by a user via the authentication screen 901 and the login processing is completed, the main menu screen 902 is displayed.

In this manner, in a case where the setting to display the authentication screen at the operation start time is made and the setting to display web contents after auto-clear is made, web contents are displayed by the signage application 300 at a timing when the auto-clear is executed. Hence, the web contents are displayed before a user operates the image processing apparatus 100. As a result, there are increased chances of catching the attention of users who have no intention of operating the image processing apparatus 100 and merely pass by the image processing apparatus 100, and a high degree of effectiveness as an advertisement can be expected.

FIGS. 9C-1 and 9C-2 are diagrams illustrating a flow of screens displayed in a case where the button 704 is selected on the screen illustrated in FIG. 7C, that is, in a case where the setting to display the authentication screen at the selection time of a function is made. Assume that "COPY", "UTILIZE STORED FILE", and "PRINT" functions are selected as functions that require authentication, as illustrated in FIG. 7D. In addition, the flow of screens illustrated in FIGS. 9C-1 and 9C-2 is the flow of screens in a case where one of the radio buttons 513 for "AFTER AUTO-CLEAR" is selected on the screen illustrated in FIGS. 5E to 5G.

In this case, the screen of the signage application 300 is not displayed even if the user authentication and the login processing is completed based on information entered via the authentication screen 901. Instead, if the transition time to auto-clear elapses without a user's operation on the operation unit 209 and the auto-clear processing is executed, the screen 801 of the signage application 300 is displayed. When the close button is pressed, the screen 801 is hidden, and the main menu screen 902 is displayed.

In this manner, web contents are displayed at a timing when the auto-clear occurs, not at a timing when the user logs in.

One of the radio buttons 513 for "AFTER AUTO-CLEAR" is selected on the screen illustrated in FIGS. 5E to 5G in this example. However, in a case where the other of the radio buttons 513 for "AFTER LOGIN" is selected, a function that requires the user authentication is selected by a user, and web contents are displayed after the user logs in. On the other hand, in a case where a function that requires no user authentication is selected, no login operation is performed, so that web contents are not displayed. There is almost no chance that web contents are seen, for example, by a user who frequently uses the "SCAN AND STORE" function but hardly uses the "COPY" function. On the other hand, setting the timing to display web contents when the auto-clear occurs allows a user who uses the image processing apparatus 100 after the auto-clear to see the web contents when operating the operation unit 209 for the first time. With this setting, the image processing apparatus 100 can operate as an apparatus for information sharing on standby state regardless of a function being used, and make users known about notification items and the like effectively. In addition, even if one of the radio buttons 513 for "AFTER LOGIN" is selected but if the setting to display the authentication screen at the selection time of a function is made, the one of the radio buttons 513 for "AFTER LOGIN" may be switched to the other of the radio buttons for "AFTER AUTO-CLEAR".

Figures 2, 9D:
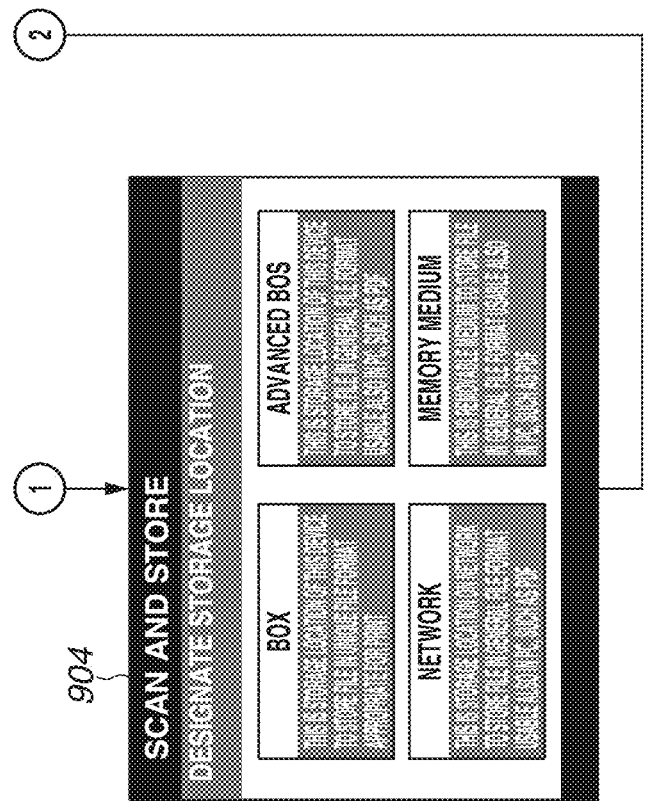

FIGS. 9D-1 and 9D-2 are diagrams illustrating a flow of screens displayed in a case where the button 702 is selected on the screen illustrated in FIG. 7A, i.e., in a case where the user authentication function is set to OFF.

In this case, similar to the case illustrated in FIGS. 9C-1 and 9C-2, the screen 801 of the signage application 300 is displayed at the timing when the auto-clear occurs.

In this manner, even in a case where the setting not to use the user authentication function is made, displaying web contents at the timing when the auto-clear occurs enables effective utilization of the image processing apparatus 100 as signage. In a case where the user authentication function is set to OFF, the screen 801 of the signage application 300 may be displayed at the timing when the auto-clear occurs regardless of whether either one of the radio buttons 513 for "AFTER AUTO-CLEAR" or the other of the radio buttons 513 for "AFTER LOGIN" is selected on each of the screens displayed in FIGS. 5E, 5F, and 5G.

FIG. 9E is a diagram illustrating a flow of screens for web content display at a print start time executed by the CPU 201. A user selects the "PRINT" function on the main menu screen 902, and then a print screen 905 is displayed. In a case where the check box 514 is checked on the screen illustrated in FIGS. 5E to 5F, if a print start operation is performed by the user with the print screen 905 being displayed, the screen 801 of the signage application 300 is displayed. When the close button is pressed, the screen 801 is hidden, and the print screen 905 is displayed. On the other hand, in a case where the check box 514 is not checked on the screen illustrated in FIGS. 5E to 5F, if the print start operation is performed by the user with the print screen 905 being displayed, the screen 801 of the signage application 300 is not displayed. Additionally, in a case where the start of a print job is accepted without the print screen 905 being displayed, the screen 801 of the signage application 300 is not displayed.

FIG. 10 is a diagram illustrating an example error screen 1001 displayed on the operation unit 209 in a case where an error is detected by the signage application 300 at a timing of the web content display. In other words, this example is an example of a screen displayed in a case where the image processing apparatus 100 is unable to display contents due to a communication error or the like. A content of the detected error is displayed in an error message display area 1002. In the example illustrated in FIG. 10, error display for notifying a user of a "communication error" is performed when the communication error is detected. An error type is not limited thereto, and an error message corresponding to the error type out of a plurality of error types, which will be described below with reference to FIG. 11, is displayed on the error message display area 1002. When a close button 1003 is pressed, an error screen is hidden.

FIG. 11 illustrates an example of errors regarding the web content display. An error table 1100 is a table in which an error code and a content of an error are associated with each other, and is used for identifying and notifying a detected error. The error table 1100 may be stored in the HDD 204 of the image processing apparatus 100 or in the content server 120.

A column of error codes 1101 indicates error codes from which the image processing apparatus 100 or the like determines a detected error. A column of error types 1102 indicates error types corresponding to the respective error codes.

A row of an error 1103 indicates a "no-file error" that occurs in a case where acquisition of web contents fails due to the absence of the web contents at the acquisition time of the web contents following the path to the content entered in the text box 505 or the text box 508 illustrated in FIGS. 5E to 5G, or other reasons.

A row of an error 1104 indicates an "authentication error" that occurs in a case where authentication is required to access the path to the content entered in the text box 505 illustrated in FIGS. 5E to 5G, and the authentication is executed in accordance with the entry in each of the text box 506 and the text box 507, and then the authentication fails. Similarly, this error includes an "authentication error" that occurs in a case where the authentication is required to access the path to the content entered in the text box 508, the authentication is performed in accordance with the entry in each of the text box 509 and the text box 510, and then the authentication fails.

A row of an error 1105 indicates a "communication error" that occurs in a case where acquisition of web contents fails due to a network failure or the like at the acquisition time of the web contents from the content server 120.

A row of an error 1106 indicates an error other than the errors 1103 to 1105 and errors 1107 and 1108, and indicates a "system error" that occurs in a case not expected in the signage application 300 due to a failure of the image processing apparatus 100 or the like. This error is an error that is detected in a case where contents cannot be displayed normally due to a failure of the image processing apparatus 100 or the like.

A row of an error 1107 indicates an "oversized data error" that occurs in a case where a size of acquired web contents exceeds a predetermined upper limit of a data size of contents that can be acquired.

A row of an error 1108 indicates a "format mismatch error" that occurs in a case where acquired web contents are not in a format displayable by the content display unit 302.

Subsequently, a description will be given of a flow of performing error display in a case where the image processing apparatus 100 detects an error at a timing of displaying web contents, which is a feature of the present exemplary embodiment.

FIGS. 12A-1 and 12A-2, and FIGS. 12B-1 and 12B-2 are diagrams each illustrating a flow of screens displayed on the operation unit 209 in a case where the display of the signage application 300 is set to ON. Furthermore, a description will be given of a case where the display of the error screen at the time of error detection is set to ON and a case where the display of the error screen at the time of error detection is set to OFF.

Figures 1, 12A:
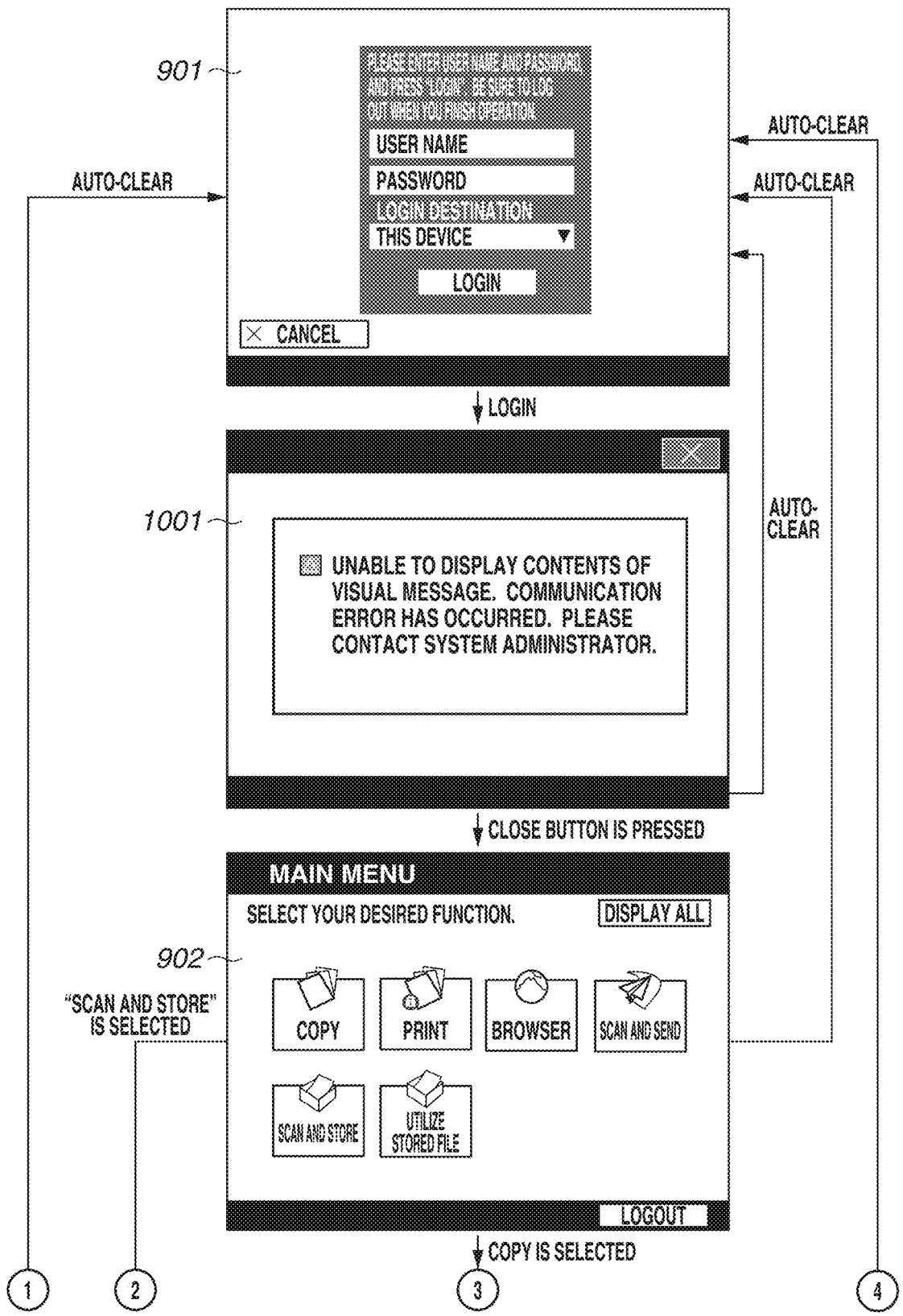
Figures 2, 12A:
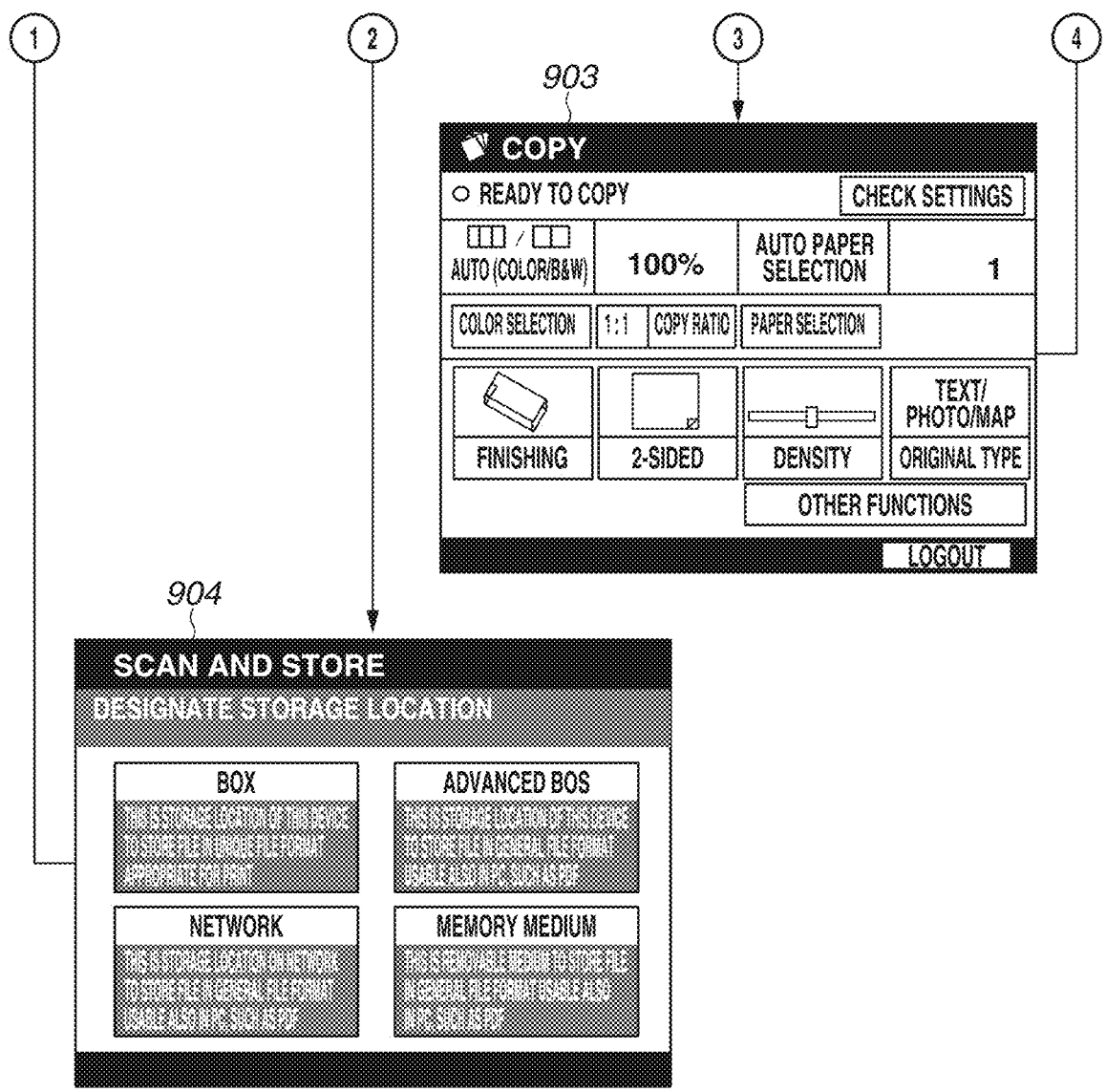

FIGS. 12A-1 and 12A-2 are diagrams illustrating a flow of screens in a case where the button 703 is selected on the screen illustrated in FIG. 7B, i.e., in a case where the setting to display the authentication screen is displayed at an operation start time is made. In addition, the flow of screens illustrated in FIGS. 12A-1 and 12A-2 is the flow of screens in a case where one of the radio buttons 513 for "AFTER LOGIN" is selected on the screen illustrated in FIGS. 5E to 5G, and the check box 515 is checked. If the user authentication succeeds based on the authentication information entered by the user via the authentication screen 901 and the signage application 300 detects a content display error at a timing of completion of the login processing, the error screen 1001 is displayed. On this screen, when the close button 1003 is pressed, the error screen 1001 is hidden, and the main menu screen 902 is displayed.

In this manner, in a case where the setting to display the authentication screen at the operation start time is made, and the setting to display web contents after login and display an error message is made, the error screen 1001 is displayed at a timing of completion of the user's login. This enables prompt notification of error information to a user at a point of time when an error of the signage application 300 occurs. There is a possibility that the error can be promptly corrected by a user who sees the error notification reports to an administrator. However, even if the user sees the error notification, it is unlikely that the user can correct the error by himself/herself, and all that the user can do is report to the administrator. Since the image processing apparatus 100 itself can be normally used even if the web content display error occurs, the error display performed every time is troublesome to the user.

Figures 1, 12B:
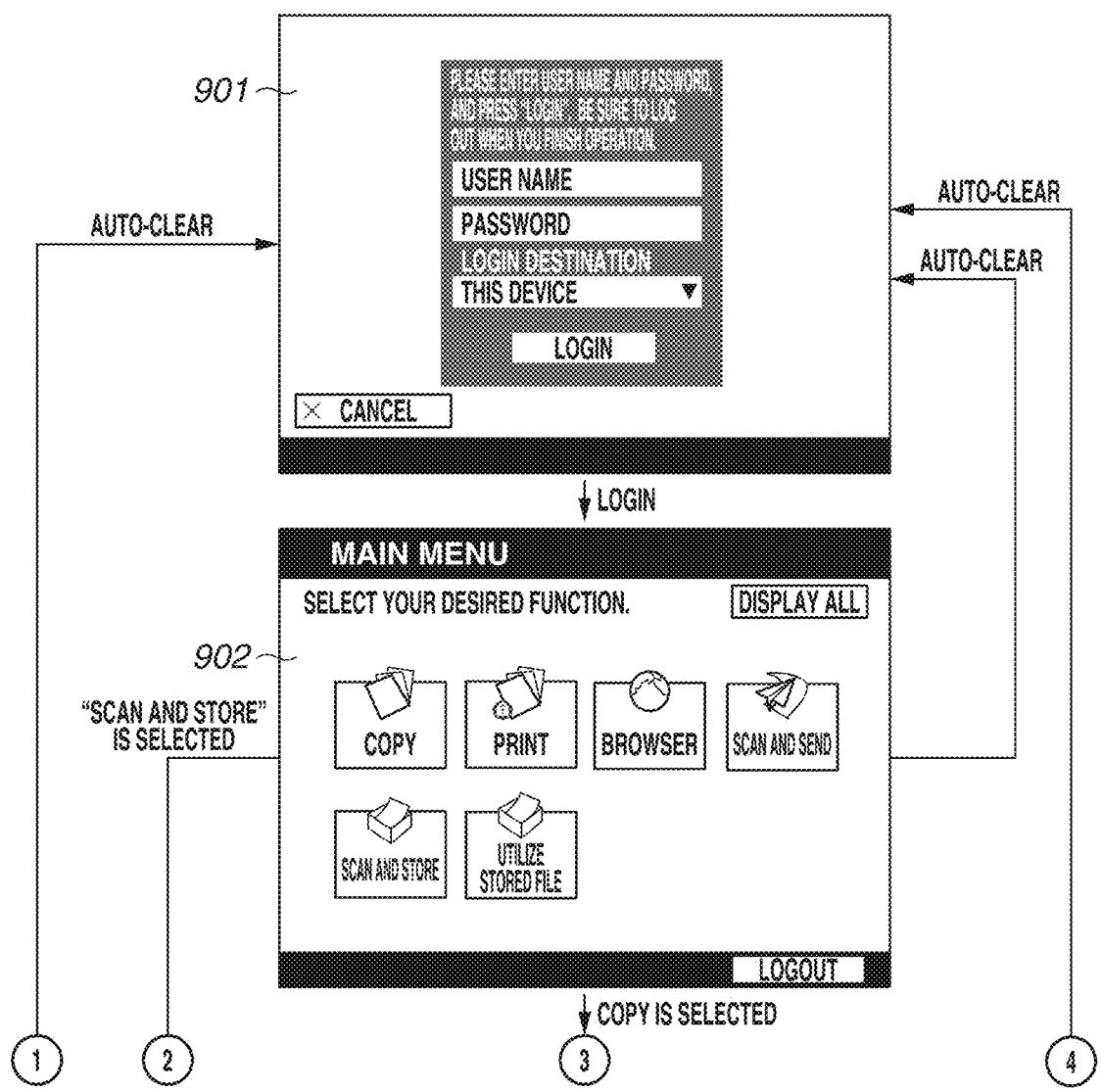
Figures 2, 12B:
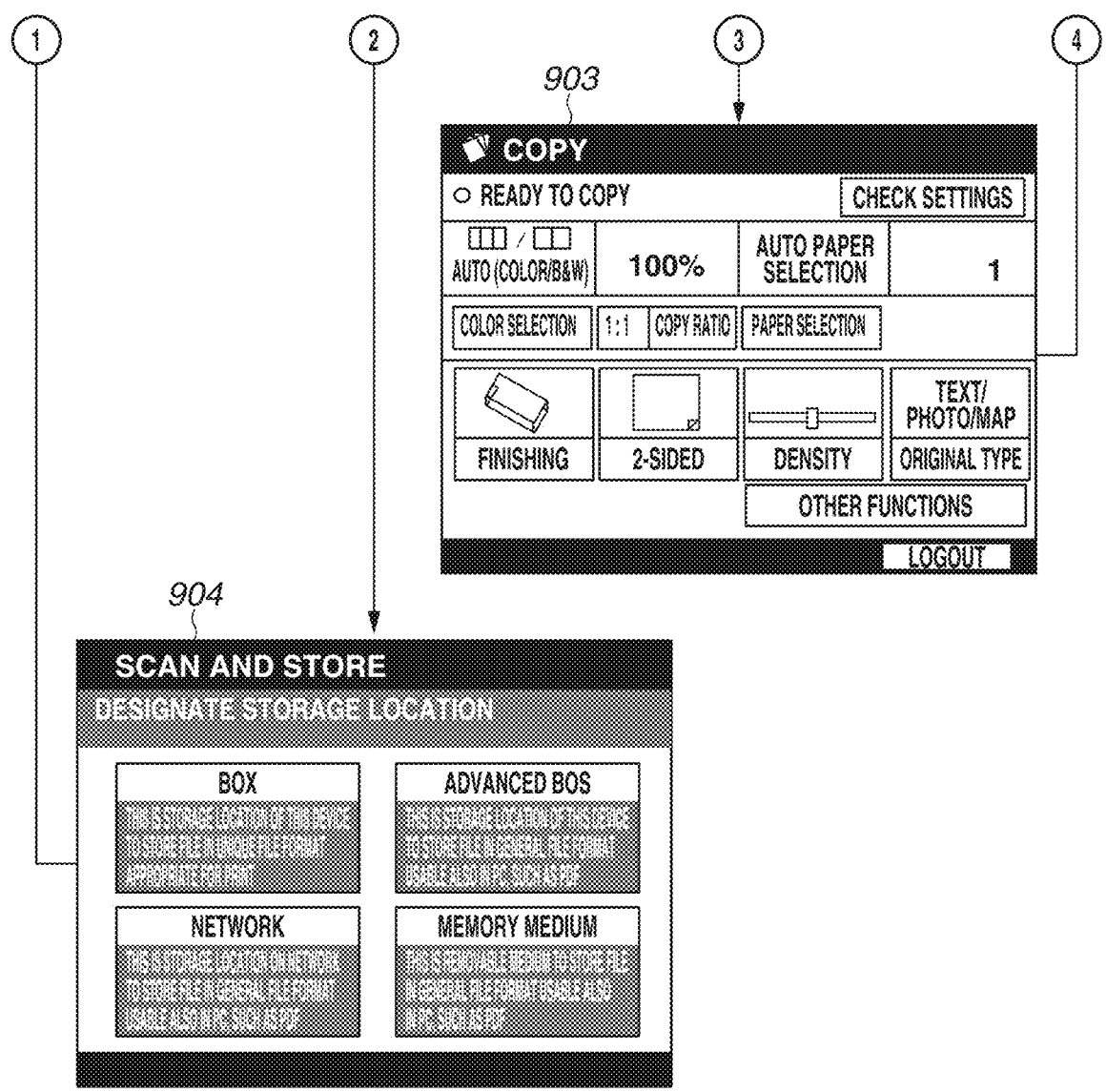

FIGS. 12B-1 and 12B-2 are diagrams illustrating a flow of screens in a case where the button 703 is selected on the screen illustrated in FIG. 7B, i.e., in a case where the setting to display the authentication screen at the operation start time is made. In addition, the flow of screens illustrated in FIGS. 12B-1 and 12B-2 is the flow of screens displayed in a case where one of the radio buttons 513 for "AFTER LOGIN" is selected on the screen illustrated in FIGS. 5E to 5G, and the check box 515 is not checked. In comparison with the flow of screens illustrated in FIGS. 12A-1 and 12A-2, the error screen 1001 is not displayed even in a case where the user authentication succeeds based on the authentication information entered by the user via the authentication screen 901, and the signage application 300 detects the content display error at the timing of completion of the login processing. In this manner, the image processing apparatus 100 can perform control not to display the error screen even in a case where the signage application 300 detects the web content display error. With this configuration, a user who has difficulty in dealing with the error has no chance of seeing an error message.

As illustrated in FIGS. 12A-1 and 12A-2, and FIGS. 12B-1 and 12B-2, an administrator can switch between ON and OFF of error notification for signage display. In a case where the settings of the signage application 300 can be made by a general user, the general user can also switch between ON and OFF of the error notification. Setting the error notification to ON increases the possibility that the administrator can notice an error early by report made by a user who sees the error notification. On the other hand, setting the error notification to OFF can prevent display of notification that is troublesome to a user.

Figure 4A:
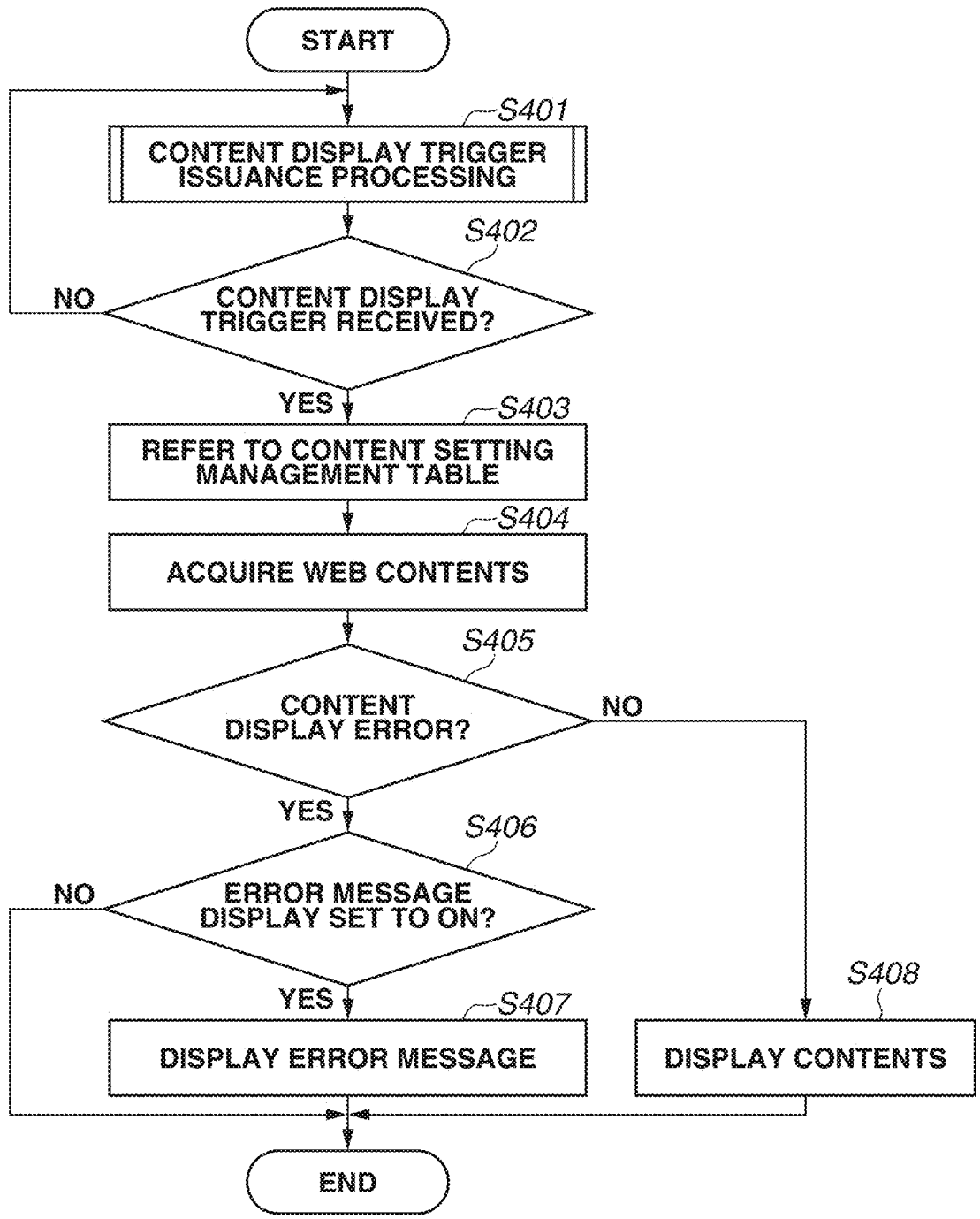
FIGS. 4A and 4B are flowcharts each illustrating a processing procedure of the information processing apparatus according to one or more aspects of the present disclosure.
Figure 4B:
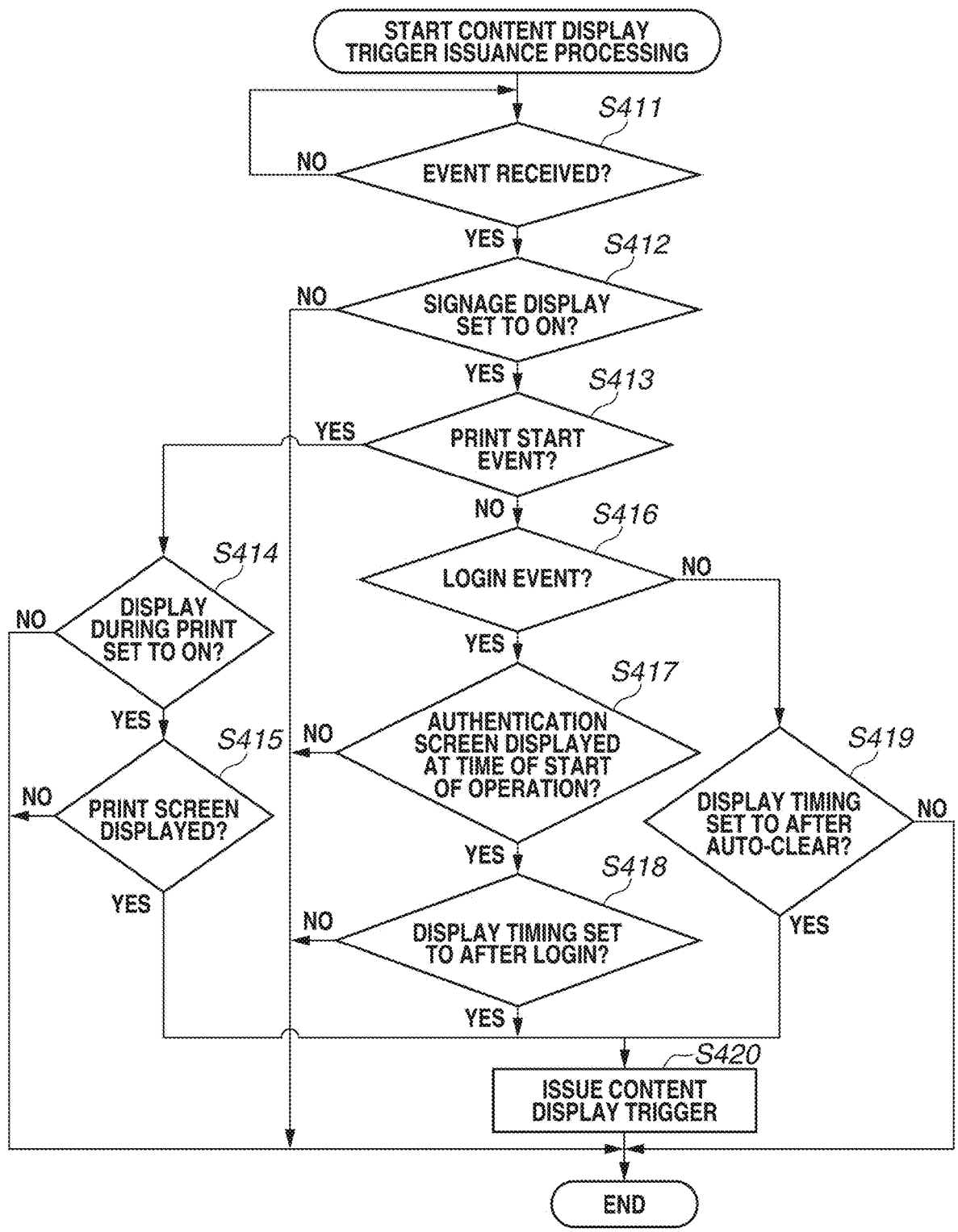

FIGS. 4A and 4B are flowcharts each illustrating processing of displaying the error screen 1001 in a case where an error is detected at a timing when the signage application 300 displays web contents. Processing in the flowcharts in FIGS. 4A and 4B is implemented by the CPU 201 loading a control program stored in the ROM 202 or the HDD 204 to the RAM 203 and executing the control program.

In step S401, the content display unit 302 executes content display trigger issuance processing. The content display trigger issuance processing is processing of detecting whether an event that causes the content display unit 302 to display contents occurs. The processing in step S401 will be described with reference to the flowchart illustrated in FIG. 4B.

FIG. 4B illustrates processing in which the event reception unit 307 receives a web content display event, and determines whether to issue the content display trigger in accordance with values set in the items 503 to 514 illustrated in FIGS. 5E to 5G.

In step S411, the event reception unit 307 determines whether it has received a login event from the authentication processing unit 308, an auto-clear event from the auto-clear processing unit 309, or a print job start event from the print management unit 310. If the event reception unit 307 determines that it has received any of the events (YES in step S411), the processing proceeds to step S412. If the event reception unit 307 determines that it has received no event (NO is step S411), the processing returns to step S411. The event reception unit 307 then waits for reception of an event.

In step S412, the content management unit 305 acquires a setting value corresponding to the key 603 from the content setting management table 306, and determines whether the display of the signage application 300 is set to ON. If the content management unit 305 determines that the display is set to OFF (NO in step S412), the processing ends.

If the content management unit 305 determines that the display is set to ON (YES in step S412), the processing proceeds to step S413.

In step S413, the event reception unit 307 determines whether the event received in step S411 is a print start event. If the event reception unit 307 determines that the event is the print start event (YES in step S413), the processing proceeds to step S414. If the event reception unit 307 determines that the event is not the print start event (NO in step S413), the processing proceeds to step S416.

In step S414, the content management unit 305 acquires a setting value corresponding to the key 614 from the content setting management table 306, and determines whether the content display at the print start time is set to ON. If the content management unit 305 determines that the display is set to OFF (NO in step S414), the processing ends. If the content management unit 305 determines that the display is set to ON (YES in step S414), the processing proceeds to step S415.

In step S415, the screen control unit 303 determines whether the print screen 905 is displayed on the operation unit 209. If the screen control unit 303 determines that the print screen 905 is not displayed (NO in step S415), the processing ends. For example, in a case of executing print at a timing of reception of print data transmitted from an external apparatus such as a PC or the like, the image processing apparatus 100 does not display signage because it is unlikely that a user is in front of the image processing apparatus 100. If the screen control unit 303 determines that the print screen 905 is displayed (YES in step S415), the processing proceeds to step S420.

In step S416, the event reception unit 307 determines whether the event received in step S411 is a login event. If the screen control unit 303 determines that the event is the login event (YES in step S416), the processing proceeds to step S417. If the screen control unit 303 determines that the event is not the login event (i.e., auto-clear event) (NO in step S416), the processing proceeds to step S419.

In step S417, the authentication processing unit 308 determines whether the display setting of the authentication screen is set to the setting to display the authentication screen at the operation start time. If the authentication processing unit 308 determines that the display setting of the authentication screen is set to the setting to display the authentication screen at the operation start time, i.e., set to the setting to display the authentication screen at the selection time of a function (NO in step S417), the processing ends. In other words, the example described here is an example of not performing display of web contents even if the login event occurs with the setting to display the authentication screen after the copy function or the scan function is selected by the user. If the authentication processing unit 308 determines that the display setting of the authentication screen is set to the setting to display the authentication screen at the operation start time (YES in step S417), the processing proceeds to step S418.

In step S418, the content management unit 305 acquires a setting value corresponding to the key 613 from the content setting management table 306, and determines whether a timing to display the web contents is after login. If the content management unit 305 determines that the timing is after the login (YES in step S418), the processing proceeds to step S420. If the content management unit 305 determines that the timing is not after the login (NO in step S418), the processing ends.

In step S419, the content management unit 305 acquires the setting value corresponding to the key 613 from the content setting management table 306, and determines whether the timing to display the web contents is after auto-clear. If the content management unit 305 determines that the timing is after the auto-clear (YES in step S419), the processing proceeds to step S420. If the content management unit 305 determines that the timing is not after the auto-clear (NO in step S419), the processing ends. That is, if the state of the image processing apparatus 100 satisfies a predetermined condition, the image processing apparatus 100 issues the content display trigger.

Referring back to FIG. 4A, in step S402, the content display unit 302 determines whether it has received the content display trigger issued in the processing in step S401. If the content display unit 302 determines that it has received the content display trigger (YES in step S402), the processing proceeds to step S403. On the other hand, if the content display unit 302 determines that it has received no content display trigger (NO in step S402), the processing returns to step S401. The content display unit 302 then repeats the processing.

In step S403, the content management unit 305 refers to the content setting management table 306, acquires a path to the web contents, and notifies the content display unit 302 of the path.

In step S404, the content display unit 302 acquires the web contents from the content server 120 based on the path acquired in step S406, and reads the web contents into the RAM 203.

In step S405, the content display unit 302 determines whether a content display error has occurred. If the content display unit 302 determines that the error has occurred (YES in step S405), the processing proceeds to step S406. On the other hand, the content display unit 302 determines that no error has occurred (NO in step S405), the processing proceeds to step S408. An example of determining whether the content display error has occurred will be described below. In a case where the content display unit 302 fails to acquire contents from the content server 120 due to a communication error or the like at the time of displaying the contents, the content display unit 302 determines that the content display error has occurred due to the "communication error". In addition, in a case where the content display unit 302 preliminarily acquires contents from the content server 120 and stores the contents in the image processing apparatus 100, a flag indicating a "no-file error" is preliminarily set if no-file exits for the set path. The content display unit 302 then determines that the content display error has occurred due to the "no-file error" based on the flag.

In step S406, the content management unit 305 acquires a setting value corresponding to the key 615 from the content setting management table 306, and determines whether an error message display is set to ON. If determining that the display is set to OFF (NO in step S406), the content management unit 305 ends the processing without displaying an error message. If the content management unit 305 determines that the display is set to ON (YES in step S406), the processing proceeds to step S407.

In step S407, the content display unit 302 or the screen control unit 303 displays the error message via the operation unit 209. At this time, in displaying a content of the error, the content display unit 302 or the screen control unit 303 displays an appropriate error message in accordance with the error code 1101 that can be obtained at the time of detection of the error.

In step S408, the content display unit 302 outputs the web contents acquired in step S404, and displays the web contents on the operation unit 209.

As described above, the image processing apparatus 100 according to the present exemplary embodiment controls display of the error message based on the display setting of the error message at the time of displaying signage. By an administrator or a user setting non-display of the error message, Not all users have to see the error screen. This prevents the users from being confused by seeing the error display screen. In addition, setting the display of the error message to ON as necessary allows a user to notice the error. This also allows the user who has noticed the error to report to the administrator or the like, and can thereby correct the error promptly.

In addition, whether to display an error notification screen may be automatically switched depending on a content of an error. More specifically, in step S405, the content display unit 302 stores the content of the current error at the time of determining whether a content display error has occurred. When displaying the error message in step S407, the content display unit 302 or the screen control unit 303 performs switching to the display of the error message if the stored content of the error indicates a specific error, and to the non-display of the error message if the content of the error indicates an error other than the specific error. The image processing apparatus 100 may be configured in such a manner that the administrator or the user can set the content of the error to be a target of the error message display on the setting screen or the like of the signage application 300 illustrated in FIGS. 5E to 5G.

In the first exemplary embodiment, the description has been given of the example of providing the setting that enables ON/OFF of the display of error notification when an error occurs at the time of displaying signage. In a second exemplary embodiment, a description will be given of an example of controlling whether to give error notification corresponding to a user who operates the image processing apparatus 100, instead of determining whether to display error notification uniformly depending on ON/OFF of the setting of error display. The basic configuration of the present exemplary embodiment is identical to that of the first exemplary embodiment, so that only a difference will be described.

Figure 13:
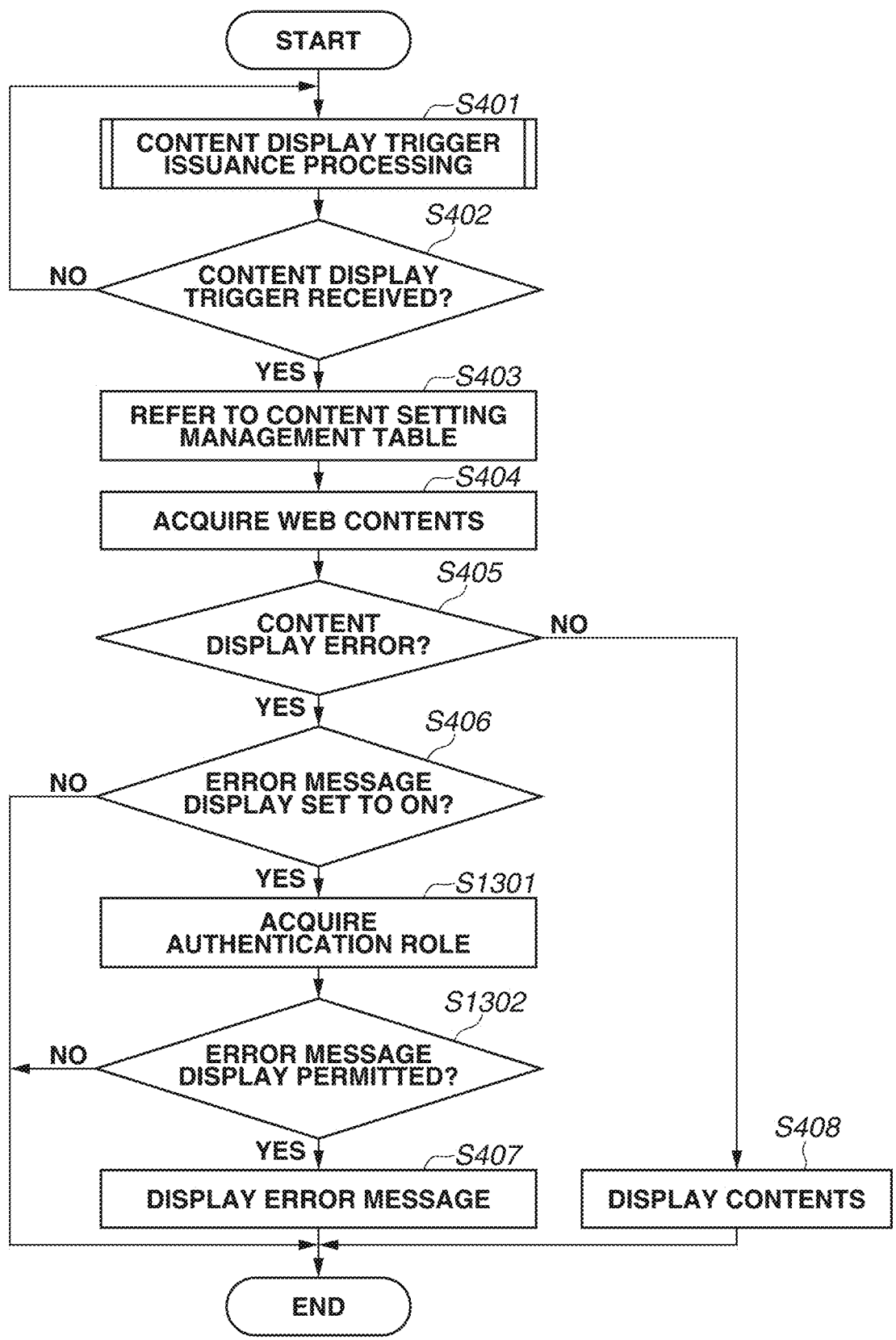
FIG. 13 is a flowchart illustrating a processing procedure of the information processing apparatus according to one or more aspects of the present disclosure.

FIG. 13 is a flowchart illustrating processing in which the signage application 300 displays the error screen 1001 in a case where an error regarding web content display occurs, according to the present exemplary embodiment.

The basic configuration of the flowchart in FIG. 13 is identical to that in FIG. 4A, so that only a difference will be described.

The authentication processing unit 308 stores each user information preliminarily registered in the image processing apparatus 100 in association with authority information such as Administrator, GeneralUser, DeviceAdmin, and NetworkAdmin. In other words, each user information is associated with the authority information indicating any one of an administrator, a network administrator, and a general user. For example, the authentication processing unit 308 can perform control to give the error notification only to the administrator, and not to give the error notification to other users. Assume that it is preliminarily set by the administrator or the like that the error notification is given to which user having which authority information.

In step S1301, the content display unit 302 acquires the authority information (authentication role) of the user who operates the image processing apparatus 100 from the authentication processing unit 308.

In step S1302, the content display unit 302 determines whether the user is a user who is permitted to see the display of the error message from the authentication role acquired in step S1301. If the content display unit 302 determines that the user has a role that permits the display of the error message (YES in step S1302), the processing proceeds to step S407. In step S407, the content display unit 302 displays the error message on the operation unit 209. On the other hand, if determining that the display of the error message is not permitted (NO in step S1302), the content display unit 302 ends the processing without displaying the contents nor the error message on the operation unit 209.

As described above, adding the determination based on the authentication role enables the display of the error message only to a specific user, and enables more appropriate display of the error message. In addition, the image processing apparatus 100 may refer to an error code illustrated in FIG. 11 when an error occurs, and may change a user to whom error notification is given depending on a content of the error. For example, in a case where the content of the error is a communication error, the image processing apparatus 100 may give an error notification to a network administrator who can deal with the error. In addition, if the content of the error is a content that can be dealt with even by a general user, the image processing apparatus 100 may give an error notification to all users.

In the first exemplary embodiment, the description has been given of the example of being capable of setting whether to display the error notification on the setting screen for the signage application 300. In a third exemplary embodiment, a description will be given of an example of further providing a setting screen for the signage application 300 with an item that allows setting of whether to notify an administrator by e-mail in a case where an error occurs at the time of displaying contents. The basic configuration of the present exemplary embodiment is identical to that of the first exemplary embodiment, so that only a difference will be described.

FIG. 14 illustrates an example of a setting screen for the signage application 300 according to the present exemplary embodiment. The setting screen is provided with a check box 1401 that enables setting of whether to notify the administrator by e-mail in a case where the error occurs at the time of displaying the contents. In a case where the display of the error message is set to OFF (check box 515 is not checked) and the error notification to the administrator by e-mail is set to ON (check box 1401 is checked) as illustrated in FIG. 14, the error screen is not displayed even if the content display error occurs. Instead, since the notification is given to the administrator by e-mail if the error occurs, the image processing apparatus 100 can give the error notification only to the administrator without displaying the notification screen to a user. In a case where the display of the error message is set to OFF (check box 515 is not checked), the error notification to the administrator by e-mail may be automatically set to ON (check box 1401 is checked). In addition, without provision of the check box 1401, the image processing apparatus 100 may automatically give the error notification to the administrator if the display of the error message is set to OFF (check box 515 is not checked).

While the description has been given of the exemplary embodiments using the image processing apparatus 100 having a plurality of functions such as the copy function and the scanner function as an example, the present disclosure is also applicable to a single-function image processing apparatus having only part of these functions. The present disclosure may be applied to other image processing apparatuses such as a personal computer, a personal digital assistant (PDA), a mobile phone, a facsimile machine, a camera, a video camera, and other image viewers.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-114214, filed Jul. 1, 2020, which is hereby incorporated by reference herein in its entirety.

What is claimed is:

1. An image processing apparatus, comprising:
a display unit;
a memory storing instructions; and
at least one processor executing the instructions causing the image processing apparatus to:
register information that identifies a web content;
display, based on detecting a login event, the web content identified by the registered information on the display unit, and display a main menu on the display unit according to non-display of the web content by a user operation, wherein the main menu screen is a screen in which a user selects a function to be executed from a plurality of functions including a copy function and a print function of the image processing apparatus; and
make a setting, based on an instruction given via a setting screen displayed on the display unit, as to whether or not to display, on the display unit, a screen indicating that the web content is unable to be displayed and as to whether or not to notify an administrator of the image processing apparatus by e-mail that the web content is unable to be displayed, in a case where the web content is unable to be displayed on the display unit of the information processing apparatus,
wherein in a case where the web content is unable to be displayed on the display unit based on detecting the login event and the setting is made to display, on the display unit, the screen indicating the web content is unable to be displayed, the screen indicating that the web content is unable to be displayed is displayed on the display unit if the login event is detected, and the main menu is displayed on the display unit according to non-display of the screen indicating that the web content is unable to be displayed by a user operation,
wherein in a case where the web content is unable to be displayed on the display unit based on detecting the login event and the setting is made to not display, on the display unit, the screen indicating that the web content is unable to be displayed, the main menu is displayed, and the administrator is notified by e-mail that the web content is unable to be displayed, if the login event is detected, on the display unit without displaying, on the display unit, the screen indicating that the web content is unable to be displayed, and
wherein, in a case where an instruction to not display on the display unit the screen indicating that the web content is unable to be displayed is given via the setting screen, an instruction to notify the administrator of the image processing apparatus by e-mail that the web content is unable to be displayed is set automatically.

2. The image processing apparatus according to claim 1, the at least one processor executing the instructions further causing the image processing apparatus to provide a setting screen that accepts the setting for an administrator.

3. The image processing apparatus according to claim 1, the at least one processor executing the instructions further causing the image processing apparatus to authorize a user of the image processing apparatus,
wherein the displaying includes displaying the web content when the user is authorized.

4. The image processing apparatus according to claim 1, the at least one processor executing the instructions further causing the image processing apparatus to execute auto-clear processing of returning a screen displayed on an operation unit of the image processing apparatus to an initial screen when an operation of the operation unit is not performed for a predetermined time period,
wherein the displaying includes displaying the web content based on the execution of the auto-clear processing.

5. The image processing apparatus according to claim 1, wherein the displaying includes displaying the web content based on a start of print processing.

6. The image processing apparatus according to claim 1, wherein the registered information indicates a path to access the web content.

7. The image processing apparatus according to claim 1, wherein the displayed web content include at least either one of an advertisement and a bulletin board.

8. The image processing apparatus according to claim 1, wherein the error includes a communication error.

9. The image processing apparatus according to claim 1, wherein the main menu screen is displayed when the error screen is closed by a user operation.

10. The image processing apparatus according to claim 1, wherein the main menu screen is a screen for allowing a user to select a function to be executed from among a plurality of functions of the information processing apparatus.

11. The image processing apparatus according to claim 10, wherein the plurality of functions includes a copy function and a print function.

12. The image processing apparatus according to claim 1, wherein, in a case where an instruction to display on the display unit the screen indicating that the web content is unable to be displayed is given via the setting screen, whether or not to notify the administrator by e-mail that the web content is unable to be displayed is selectable.

13. A method for an image processing apparatus, the method comprising:
   registering information that identifies web content to make a user of the image processing apparatus known about information;
   displaying, based on detecting a login event the web content identified by the registered information, and display a main menu according to non-display of the web content by a user operation, wherein the main menu screen is a screen in which a user selects a function to be executed from a plurality of functions including a copy function and a print function of the image processing apparatus; and
   making a setting, based on an instruction given via a setting screen displayed on the display unit, as to whether or not to display a screen indicating that the web content is unable to be displayed and as to whether or not to notify an administrator of the image processing apparatus by e-mail that the web content is unable to be displayed, in a case where the web content is unable to be displayed on the information processing apparatus,
   wherein in a case where the web content is unable to be displayed based on detecting the login event and the setting is made to display the screen indicating the web content is unable to be displayed, the screen indicating that the web content is unable to be displayed is displayed if the login event is detected, and the main menu is displayed according to non-display of the screen indicating that the web content is unable to be displayed by a user operation,
   wherein in a case where the web content is unable to be displayed based on detecting the login event and the setting is made to not display the screen indicating that the web content is unable to be displayed, the main menu is displayed, and the administrator is notified by e-mail that the web content is unable to be displayed, if the login event is detected, without displaying the screen indicating that the web content is unable to be displayed, and
   wherein, in a case where an instruction to not display on the display unit the screen indicating that the web content is unable to be displayed is given via the setting screen, an instruction to notify the administrator of the image processing apparatus by e-mail that the web content is unable to be displayed is set automatically.

14. The method according to claim 13, wherein, in a case where an instruction to display on the display unit the screen indicating that the web content is unable to be displayed is given via the setting screen, whether or not to notify the administrator by e-mail that the web content is unable to be displayed is selectable.

* * * * *